(12) United States Patent
Arnusch et al.

(10) Patent No.: US 11,027,240 B2
(45) Date of Patent: Jun. 8, 2021

(54) ANTIBIOFILM AND ANTIMICROBIAL FUNCTIONAL MEMBRANE SPACER

(71) Applicants: B.G. Negev Technologies and Applications Ltd., at Ben-Gurion University, Beer-Sheva (IL); William Marsh Rice University, Houston, TX (US)

(72) Inventors: Christopher John Arnusch, Midreshet Ben-Gurion (IL); Swatantra Pratap Singh, Midreshet Ben-Gurion (IL); Franklin Sargunaraj, Midreshet Ben-Gurion (IL); Yoram Oren, Beer-Sheva (IL); James Mitchell Tour, Bellaire, TX (US); Yilun Li, Houston, TX (US)

(73) Assignees: B.G. Negev Technologies and Applications Ltd., at Ben-Gurion University, Beer-Sheva (IL); William Marsh Rice University, Houston, TX (US)

(*) Notice: Subject to any disclaimer, the term of this patent is extended or adjusted under 35 U.S.C. 154(b) by 37 days.

(21) Appl. No.: 16/099,971

(22) PCT Filed: May 16, 2017

(86) PCT No.: PCT/IL2017/050545
§ 371 (c)(1),
(2) Date: Nov. 8, 2018

(87) PCT Pub. No.: WO2017/199247
PCT Pub. Date: Nov. 23, 2017

(65) Prior Publication Data
US 2019/0143275 A1 May 16, 2019

Related U.S. Application Data

(60) Provisional application No. 62/336,794, filed on May 16, 2016, provisional application No. 62/454,811, filed on Feb. 5, 2017.

(51) Int. Cl.
*B01D 65/08* (2006.01)
*B01D 63/10* (2006.01)
(Continued)

(52) U.S. Cl.
CPC ............ *B01D 65/08* (2013.01); *B01D 63/10* (2013.01); *B01D 65/022* (2013.01);
(Continued)

(58) Field of Classification Search
CPC .... B01D 2253/102; B01D 2255/20707; B01D 2255/802; B01D 2258/06;
(Continued)

(56) References Cited

U.S. PATENT DOCUMENTS

2006/0169631 A1  8/2006  Tung et al.
2013/0015136 A1  1/2013  Bennett
(Continued)

FOREIGN PATENT DOCUMENTS

WO    2015175060 A2    11/2015
WO    WO-2015175060 A2 * 11/2015 ............ H01M 4/663

OTHER PUBLICATIONS

Kumar, Prashant, et. al., Graphene Produced by Radiation-Induced Reduction of Graphene Oxide, 2011, International Journal of Nanoscience, vol. 10, Nos. 4 & 5, 559-566. (Year: 2011).*
(Continued)

*Primary Examiner* — Bradley R Spies
*Assistant Examiner* — Jeannie McDermott
(74) *Attorney, Agent, or Firm* — Dickinson Wright PLLC; Ross Spencer Garsson

(57) ABSTRACT

Disclosed herein methods for combating biofouling in a liquid, e.g. an aqueous medium by providing a surface coated with at least one laser-induced graphene (LIG) layer in said liquid medium. Particularly disclosed herein method and devices for treating water comprising passing a water
(Continued)

stream through a membrane module equipped with at least one spacer coated with at least one layer of LIG, and optionally by applying an electric potential to the at least one LIG layer to achieve a bactericidal effect in the water stream. Specifically, disclosed herein a polymeric mesh suitable for use as a spacer in a membrane module in water treatment application, said mesh being at least partially coated with LIG.

18 Claims, 24 Drawing Sheets

(51) Int. Cl.

| | | |
|---|---|---|
| *C02F 1/44* | (2006.01) | |
| *C01B 32/184* | (2017.01) | |
| *C02F 1/467* | (2006.01) | |
| *B01D 65/02* | (2006.01) | |
| *C08J 7/06* | (2006.01) | |
| *C08G 73/10* | (2006.01) | |
| *C02F 1/461* | (2006.01) | |

(52) U.S. Cl.
CPC .............. *C01B 32/184* (2017.08); *C02F 1/44* (2013.01); *C02F 1/4672* (2013.01); *C02F 1/4674* (2013.01); *C08G 73/10* (2013.01); *C08J 7/06* (2013.01); *B01D 2313/143* (2013.01); *C02F 2001/46133* (2013.01); *C02F 2303/04* (2013.01); *C02F 2303/20* (2013.01); *C02F 2305/023* (2013.01); *C02F 2305/08* (2013.01); *C08J 2379/08* (2013.01)

(58) Field of Classification Search
CPC ............ B01D 2259/804; B01D 46/023; B01D 46/50; B01D 53/0407; B01D 53/8687; B01J 20/261; B01J 20/28004; B01J 20/28007; B01J 20/28026; B01J 20/28061; B01J 20/28064; B01J 20/2808; B01J 20/28083; B01J 20/28085; B01J 20/3234; B01J 20/327; B01J 20/3276; B01J 21/063; B01J 21/18; B01J 2220/445; B01J 23/75; B01J 31/003; B01J 35/004; B01J 35/1019; B01J 35/1023; B01J 35/1047; B01J 35/108; B01J 37/0201; B01J 37/08; B82Y 15/00; B82Y 30/00; B82Y 40/00; C02F 1/001; C02F 1/14; C02F 1/283; C02F 1/441; C02F 1/4695; C02F 1/68; C02F 2101/12; C02F 2103/04; C02F 2209/05; C02F 3/108; C02F 9/00
See application file for complete search history.

(56) References Cited

U.S. PATENT DOCUMENTS

| | | | |
|---|---|---|---|
| 2013/0233799 A1* | 9/2013 | Dosoretz | .................. C02F 1/44 |
| | | | 210/650 |
| 2013/0256211 A1 | 10/2013 | Fleming | |
| 2015/0075992 A1* | 3/2015 | Cui | ...................... C02F 1/4695 |
| | | | 204/674 |
| 2015/0224450 A1* | 8/2015 | Jassby | .................. B01D 71/021 |
| | | | 210/500.27 |

OTHER PUBLICATIONS

Trusovas, Romualdas, et. al., Laser Induced Graphite Oxide/Graphene Transformation, 2012, Journal of Laser Micro/Nanoengineering, vol. 7, No. 1, 49-53 (Year: 2012).*
Russo, P, et al, In liquid laser treated graphene oxide for dye removal, 2014, Applied Surface Science, 348, 85-91 (Year: 2014).*
Parra et al.A nanomolecular approach to decrease adhesion of biofouling-producing bacteria to graphene-coated material, 2015, J Nanobiotechnol 13:82 DOI 10.1186/s12951-015-0137-x (Year: 2015).*
Lee, Jeawoo, et al, Graphene oxide nanoplatelets composite membrane with hydrophilic and antifouling properties for wastewater treatment, 2013, Journal of Membrane Science 448, 223-230 (Year: 2015).*
Wang, Jun, et al., Adsorption and coadsorption of organic pollutants and a heavy metal by graphene oxide and reduced graphene materials) teaches adsorption properties of graphene, 2015, Chemical Engineering Journal 281, 379-388 (Year: 2015).*
Tiwari, Jitendra, Reduced graphene oxide-based hydrogels for the efficient capture of dye pollutants from aqueous solutions, 2013, C A R B O N 5 6, 1 7 3-1 8 2 (Year: 2013).*
Lin J. et al. "Laser-induced porous graphene films from commercial polymers" (2014) Nature Communications, vol. 5, No. 5714, pp. 1-8, DOI: 10.1038/ncomms6714 (published on line Dec. 10, 2014).
Zou X. et al."Mechanisms of the Antimicrobial Activities of Graphene Materials" (2016) J. Am. Chem. Soc., vol. 138, No. 7,pp. 2064-2077, DOI: 0.1021/jacs.5b11411 (published online Jan. 29, 2016).
Nine M. J. "Graphene: a multipurpose material for protective coatings" (2015) Journal of Materials Chemistry A, vol. 3 No. .24 pp. 12580-12602, DOI: 10.1039/c5ta01010a published on-line Apr. 2, 2015) the whole document Apr. 2, 2015 (Apr. 2, 2015).

* cited by examiner

Figure 5
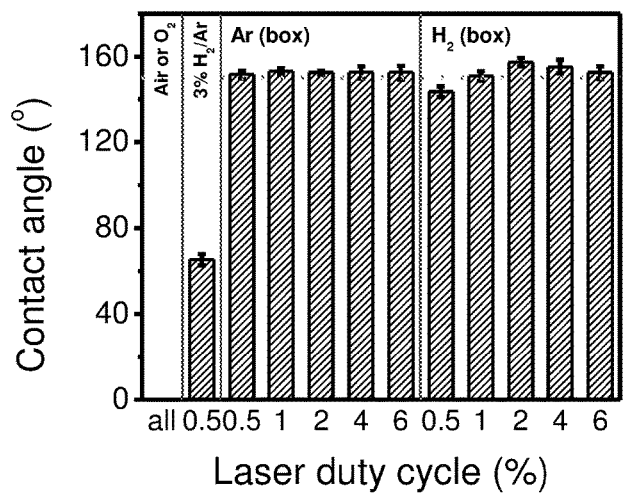
Figure 6
Figure 6a
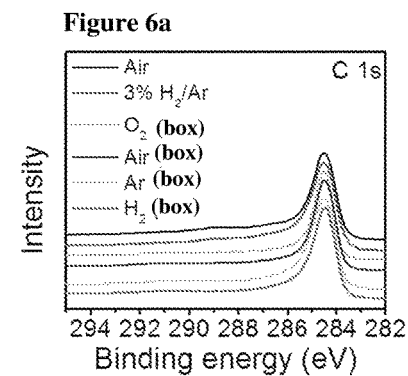
Figure 6b
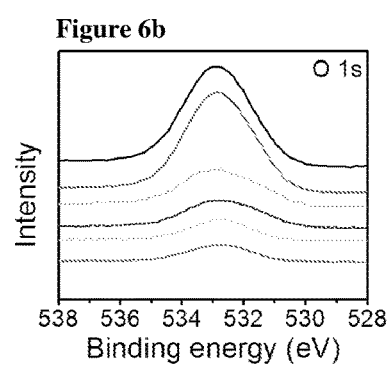
Figure 6c
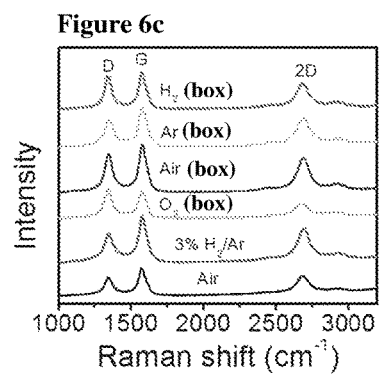
Figure 6d
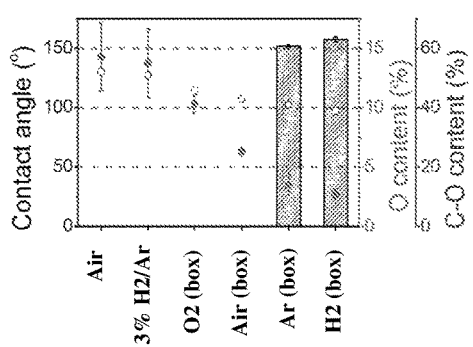
Figure 6e
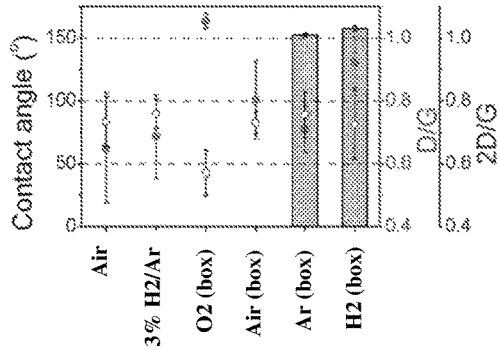

(a)                  (b)

ANTIBIOFILM AND ANTIMICROBIAL FUNCTIONAL MEMBRANE SPACER

CROSS-REFERENCE TO RELATED PATENT APPLICATIONS

This application is a U.S. 371 National Phase application which claims priority and benefit to PCT/IL2017/050545 filed on May 16, 2017 and entitles "ANTIBIOFILM AND ANTIMICROBIAL FUNCTIONAL MEMBRANE SPACER" and is hereby incorporated herein by reference in its entirety for all purposes.

The present invention generally relates to the prevention of fouling of surfaces in a liquid medium, e.g. in water treatment technology. More specifically, the present invention relates to methods of prevention of fouling, biofouling and bacterial or microbial growth, for example on solid surfaces, e.g. in water treatment devices, e.g. membranes or spacers, to the use of graphene, e.g. laser-induced graphene, in these applications, and to the antimicrobial and/or antibiofilm spacer components that may further be adapted to prevent said fouling, e.g. by providing electrical current in-situ, inter alia, for generation of reactive species, e.g. active chlorine species and reactive oxygen species, and for direct killing of microbes via electrical effects, or contact with the graphene surface.

Flat sheet membranes are currently used in many water treatment applications including microfiltration, ultrafiltration, nanofiltration and reverse osmosis. These flat sheet membranes are often configured in a spiral wound element. One of the critical components of the spiral wound modular element is a woven or non-woven net spacer (a functional spacer), which provides critical mechanical support for the membranes, provides a physical separation between the wound membrane sheets and components, and enhances mixing of the solution in the feed channel by promoting vortexes and different flow patterns. Much effort has been invested to study the spacer geometry for optimization of performance in terms of mass transfer and mechanical energy dissipation; however, a major problem that has yet to be addressed is biofilm formation on the spacer, or on the membrane near the spacer. Development of low fouling spacers will thus greatly increase the membrane module element lifetime, reduce cost of operation and increase membrane productivity by reducing the number and frequency of membrane cleaning-in-place procedures, overall reducing the cost of energy and membrane replacement costs.

Graphene has a number of remarkable mechanical and electrical properties. It is substantially stronger than steel at the same dimensions and it is stretchable. The thermal and electrical conductivity is very high and it can be used as a flexible conductor ("Scientific Background on the Nobel Prize in Physics 2010, GRAPHENE". The Royal Swedish Academy of Science). Typically, graphene contains not more than 10 carbon layers. Graphene has been suggested as water-filtration membrane coating component, as in, e.g. US patent application 20160023167. Similarly, carbon nanotubes were disclosed as water-filtering component, e.g. in US patent application 20120234694, and their use was also suggested in membrane coatings by ink-jet printing, as in e.g. PCT publication WO 2015/079442. Additionally, PCT publication WO 2013/050595 describes electroporation of biofilm on a membrane surface coated with carbon nanotubes by 10-millisecond pulses of 100 V at 20 Hz for 10 minutes, and PCT publication WO 2014/117255 describes cleaning a carbon nanotubes-coated membrane, by the evolving gas.

Laser-induced graphene (LIG) has been disclosed, e.g. in WO2015/175060. LIG can be generated on a polymeric surface, e.g. polyimide sheets using laser cutting equipment. Due to the nature of the equipment for this method, the LIG may be applied in patterns. This thin layer of graphene is conductive and may be used as electrodes for electrochemical reactions (Jian Lin et al. 2015. Laser-induced porous graphene films from commercial polymers. Nat. Commun.; 5: 5714. doi:10.1038/ncomms6714).

There is a need in the art to provide spacer components for water treatment systems that effectively prevent biofouling. There is also a need in the art to provide a method of cleaning of a water treatment membrane. There is further need in the art to provide methods to generate sufficient amount of active chlorine or reactive oxygen species e.g. $H_2O_2$, in the vicinity of the biofouling microbiota, to remove or inhibit the biofouling without degrading the membrane itself.

It has now been found by the present inventors that laser-induced graphene (LIG) has antimicrobial and antibiofilm properties. LIG contains one or more layers, e.g. ~3 on average. It is generally turbostratic, meaning that there is no order between the layers. LIG may be formed on a polymer surface of polymer sheets, e.g. polyimide sheets, and may assume different shapes and morphologies, including LIG nanofibers or scrolled graphene structures (LIGs), dependent on the fabrication conditions. The term "LIG" encompasses all such shapes and morphologies. Generally, LIG is a single or few-sheet of a polycrystalline carbon layer(s), e.g. less than 10 layers, with atoms arranged in multiple polygon configurations, e.g. pentagon, hexagon and heptagon structures, which is in contrast to "classic" graphene consisting exclusively of sp2-hybridized carbon hexagons. Therefore the terms "laser-induced graphene" and/or "LIG" encompass molecules structured into polycrystalline turbostratic carbon layers, arranged in pentagon, hexagon and heptagon configurations, in any shape or morphology. We have found that bacteria do not attach nor create biofilm in the presence of LIG or on LIG-coated components, and moreover, bacterial contact with LIG surfaces leads to cell inactivation, which may be termed as "passive antibiofouling" by LIG-coating.

It has been additionally found by the present inventors that applying electric current to an indwelling electrode on a surface of a water-treatment device component, e.g. a spacer component, e.g. to the surface of LIG-coated components, provides efficient biofouling control. Without being bound by a theory it is believed that in the presence of ions, e.g. chloride ions that are present in, for example, seawater or saltwater, the electric current generates active chlorine and reactive oxygen species as defined hereinbelow, in a controllable manner, and/or attracts the microorganisms to the vicinity of the LIG-coated components. This aspect may be termed as "active antibiofouling".

SUMMARY OF THE INVENTION

In some aspects of the present invention is provided a method of combating biofouling in a liquid medium, e.g. in an aqueous or a non-aqueous medium, by providing at least one surface comprising laser-induced graphene, in said liquid medium. The surface comprising laser-induced graphene may be a surface coated with at least one laser-induced graphene (LIG) layer. In some embodiments, the surface comprising laser-induced graphene may be the surface which is prone to biofilm formation before being LIG-covered.

Sometimes, the surface comprises a polymeric material. In these embodiments, the method comprises applying a layer of LIG onto said polymer material, e.g. coating said polymer material with at least one layer of LIG, to form an LIG layer thereon. Additionally or alternatively, the method comprises irradiating said surface with a laser beam to form an LIG layer thereon.

In some embodiments, the surface prone to biofilm formation is a surface of a pipe, a watercraft, a fuel storage tank, or of an element in a water-treatment device. In some particularly preferred embodiments, the surface in a water treatment device is a membrane spacer.

In further embodiments, the method comprises applying electrical potential to said LIG layer. Preferably, said electrical potential may be in the range between 0.5 V and 5 V, e.g. between 1.1 V and 4.5 V, or further preferably, in the range between 1.1 V to 3.5 V, e.g. between 1.5 V and 3.5 V. The electric potential may be applied continuously for a designated period. The periods are preferably at least 1 second long.

In another aspect, provided herein a method for treating water. The method comprises passing a water stream through a membrane module equipped with at least one spacer coated with at least one layer of LIG. The method further comprises applying an electric potential to the at least one LIG layer, to achieve a bactericidal effect in the water stream.

In a further aspect, provided herein a polymeric mesh spacer suitable for use in a membrane module of a water treatment application. The mesh spacer is at least partially coated with laser-induced graphene (LIG). The mesh spacer comprises a polymer, preferably a polyimide, e.g. the mesh spacer comprises poly-(4,4'-oxydiphenylene-pyromellitimide). In some embodiments, the mesh spacer is coated with at least two separate spaced apart LIG patterns.

In some further embodiments, the mesh may comprise means for electrically connecting LIG layers. Preferably, the layers are electrically connected to at least one power source.

In a further aspect, provided herein a water treatment device. The water treatment device may comprise a membrane module and a spacer, e.g. membrane spacer, disposed therein. Preferably, the spacer may comprise an electrode material, further preferably the electrode material may consist of LIG. In some embodiments, the electrode material may be disposed on the spacer to form at least two spaced apart electrodes.

BRIEF DESCRIPTION OF THE DRAWINGS

FIG. 5 shows contact angles of LIG samples made under different gas atmosphere with different laser duty cycles. Dashed line at 1500, as is the minimum contact angle required for superhydrophobicity.

FIG. 6 shows spectroscopy characterizations. (a,b) XPS and (c) Raman spectra for LIG samples made under different gas atmosphere. A 2% laser duty cycle was used for these samples; (a) normalized C is spectra, (b) O is spectra. (d) The relationship between contact angle, O content, and C—O bond content (of total O content) for LIG samples made under different gas atmosphere. (e) The relationship between contact angle, D/G ratio, and 2D/G ratio for LIG samples made under different gas atmosphere. (d) and (e) are calculated from (a-c).

DETAILED DESCRIPTION OF THE INVENTION

Figure 1A:
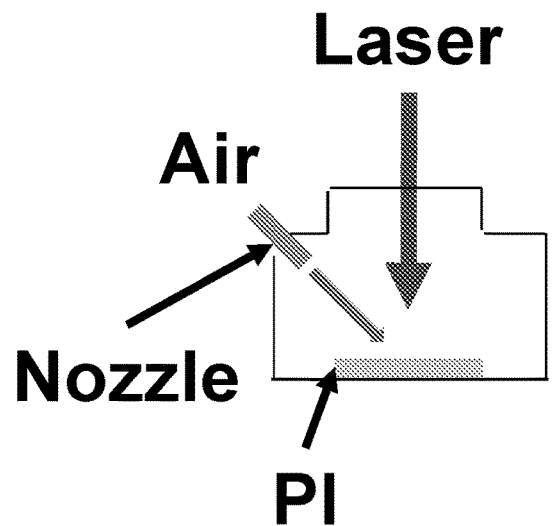
FIG. 1a shows fabrication of LIG with gas assist.

LIG can be fabricated, for example, on Kapton®, a polyimide (PI) (poly-(4,4'-oxydiphenylene-pyromellitimide)), or on poly(ether imides), or on other suitable polymers. The polymers can be in the form of sheets, which could further be used in roll-to-roll processes, streamlining scale-up. Then, using laser scribing, conducted with a $CO_2$ laser cutter system, such as for example, Universal X-660 laser cutter platform, e.g. XLS10MWH, the polymer, e.g. PI, surface can be converted into LIG. Laser-induced graphenes (LIG) may be prepared under different gases based on a gas box design, such as without being limited to, 100% air, or under hydrogen ($H_2$), or argon (Ar), or oxygen ($O_2$) atmosphere, at laser-specific power in the range of 1.50-2.25 W, inclusive, (2%-3% at 75 W). The ultimate laser powers can vary and the duty cycles varied. For example, one can use a 75 W laser at 2% power, or duty cycle, meaning that the laser is "on" only 2% of the time. The duty cycle depends on the wattage of the laser used and also the fluence or the step size between the laser pulses as it traverses across the polymer (e.g. the pulses density per area, and the rastering speed), e.g. PI substrate, producing LIG, depending on the fluence.

Characterization of LIG may be performed by a scanning electron microscope (SEM, such as for example FEI Quanta 400 high resolution field emission instrument), by a transmission electron microscope (TEM, such as for example 80 KeV JEOL ARM200F), by an X-ray photoelectron spectroscopy (XPS, such as for example PHI Quantera), and by a Fourier transform infrared spectroscopy (FT-IR, such as for example Nicolet infrared spectroscope), as known in the art.

The bactericidal properties of LIG may be examined using an assay that measures bacterial viability after incubation of the bacteria on LIG surface. In contrast with the control untreated polymer surface, LIG samples were found to be highly bactericidal. The antibiofouling and antibiofilm properties of LIG were observed in a flow cell experiment that showed the biofilm resistance of LIG samples to both Gram negative strains *Pseudomonas aeruginosa*, and *Sphingomonas wittichii*, and Gram positive strain *Enterococcus faecalis*, and in secondary treated wastewater containing mixed culture of multiple phyla. One aspect of the invention is therefore directed to use of laser-induced graphene (LIG), in controlling microorganisms. This demonstrates a passive antimicrobial use of the LIG, meaning that the LIG, with no other influence, is antimicrobial. In an additional aspect the invention is directed to use of laser-induced graphene (LIG), in controlling biofouling. This demonstrates a passive antibiofouling use of the LIG, meaning that the LIG, with no other influence, is anti-biofouling.

As used herein the terms "controlling microorganisms", "antimicrobial" and the like refer to the reduction or the removal of microorganisms adhering to a polymer surface. LIG was found to be useful in controlling bacteria using a contact killing assay described herein below. LIG would further be expected to be useful in controlling other microorganisms, such as for example fungi, algae, protozoa and viruses, in a similar manner.

As used herein, the term "biofouling" is used to describe an attachment and/or biofilm formation, of organisms or microorganisms that live in the liquid, e.g., in water, to surfaces, particularly to man-made surfaces. Non-limiting examples of such organisms include bacteria, algae, fungi, and barnacles.

The present invention describes a polymeric material with laser-induced graphene (LIG) surface, for use in water treatment devices and systems. Such polymeric materials form another aspect of the invention. The polymeric materials may comprise a single polymer or a blend of two or more polymers or a block copolymer of two or more segments, with one said polymer or segment of a copolymer being capable of conversion to LIG upon laser irradiation. Additionally, the polymeric material may be in form of a laminate with the outermost layer being a polymer capable of conversion to LIG upon laser irradiation. Examples of suitable polymers capable of conversion to LIG include vinyl polymers (or more generally chain growth polymers) or condensation polymers (or more generally step growth polymers), such as polyimide (PI), polyetherimide (PEI). Polyimide is particularly preferred. The particularly preferred polyimide is poly-(4,4'-oxydiphenylene-pyromellitimide). The polymeric materials may be provided in a form of, for example, films, fibers, fabrics, coupons, blocks, logs, pellets, or particular articles made therefrom, while films are particularly preferred.

The laser-induced graphene (LIG) may be produced on suitable surfaces using a suitable laser source, e.g. $CO_2$ laser with wavelength, e.g. 10.6 microns. Generally, the power of the laser beam may be from 0.5 to 5 W, e.g. at power of 1.5 W, 1.875 W or 2.25 W, being 2, 2.5, or 3% of the laser power with 75 W source. The laser-induced graphene may have any number of chemical or physical variations, e.g. oxidations, as long as it is robust and preferably conductive. Generally, thus-obtained LIG may comprise above 70% of carbon, e.g. above 85%, above 87%, or above 90%, and may also comprise oxygen and/or nitrogen. The LIG may be obtained as porous layer of varying thickness and porosity. The term "robust", as used herein in reference to the LIG layer, should be construed as resiliency to withstand handling of the polymeric material into an article of manufacture with minimal change to the conductivity and less than 10% loss of the coating throughout the use. Robustness may be increased by laminating screen-like or other films over the coating. Generally, the term "conductive" as used herein in reference to the LIG layer should be construed as having a minimum conductivity of the LIG layer of at least 500 ohm/square sheet resistance, preferably below 100 ohm/square and most preferably between 50 and 15 ohm/square sheet resistance.

Laser-induced graphene may also be collected from the polymer wherefrom it is obtained and coated onto a suitable surface. The coating may be performed as known in the art, e.g. by heating the polymeric surface and applying LIG powder thereon, or by applying a varnish or a paste comprising LIG.

A polymer material with laser-induced graphene (LIG) on its surface may be used in various products and devices for applications that require antimicrobial and/or antifouling properties. For such applications the entire surface or a fraction of the surface of the polymeric material (product/device) may be irradiated. The fraction/the specific surface area to be irradiated may be determined based on the intended use of the product/device. Non-limiting examples of such products and devices comprise medical devices, such as implants, dental devices, packaging e.g. for food and pharmaceuticals, water-indwelling devices, such as pipes and hulls of ships and other watercrafts, fuel storage tanks, devices for purifying aqueous solutions, for example water treatment systems, devices for purifying a gas, etc. Water desalination systems and water treatment systems, especially the membrane spacers used in some configurations thereof, are particularly preferred.

In water treatment systems, in particular in membrane-based systems, a polymer material with laser-induced graphene on its surface may be used in functional spacers. In addition to antibacterial effect of the LIG, applying electric current to an indwelling electrode on a surface of a spacer component, e.g. to the surface of LIG-coated components, in presence of chloride ions generates active chlorine species, reactive oxygen species, and attracts and kills microbes due to electrical effects as defined hereinbelow in controllable manner, providing efficient biofouling control. This aspect constitutes use of the LIG for active antibiofouling. Additionally to LIG, the electrodes may include other conductive materials, such as classic graphene, graphite, and metals, such as silver or copper. Either material may be anode (a) or cathode (c). The electrode couples may include graphene (a)—graphene (c), graphene (a)—silver (Ag) (c), graphene (a)—copper (Cu) (c), graphite (a)—graphite (c), graphite (a)—Ag (c), graphite (a)—Cu (c), graphite (a)—graphene (c), graphene (a)—graphite (c), and LIG electrode may be used in any of the above pairs in place of any other electrode. Metals or metal—containing or graphite containing epoxies or other adhesives are particularly useful for attaching electrical source wires to the LIG films. The use of LIG as an electrode is especially preferred due to its presently described antibacterial and/or antifouling effect.

Preferably, both electrodes, i.e. cathode and anode, may be placed on the spacer. Additionally, only a single electrode may be placed on the spacer component, either as anode or as a cathode such that active chlorine and/or oxygen species are generated when the circuit is closed, and the microbes are attracted to the close proximity of the electrodes. A first electrode may be placed anywhere in liquid communication with the second electrode, preferably in close proximity. Alternatively, only one electrode may be placed on the spacer, e.g. one side of the spacer may be coated with LIG, and a second electrode, e.g. graphite electrode, may be placed in feed stream inlet.

One aspect of the invention is therefore directed to a functional spacer that includes a polymer material with laser-induced graphene on its surface. Especially preferred is a functional mesh spacer that includes a polymer mesh composed of polyimide with laser-induced graphene (LIG) fabricated in an ordinary configuration as known in the art, e.g. as described in the Examples section below. As used herein unless the context clearly dictates otherwise, the terms "spacer", "spacer component", "membrane spacer", "polymer mesh", "mesh spacer" and the like, as used interchangeably herein, refer to a mesh made of polymeric material, suitable for use as a spacer in membrane modules of water treatment systems, particularly in spiral-wound configurations. The mesh is usually disposed between the consecutive wounds of the membrane envelope, and prevents contact therebetween. The mesh allows aqueous stream flow across the membrane surface and through the membrane. The term may refer to a configuration of interwoven strands, such as a net, or may represent a pattern in a sheet comprising a plurality of openings and characterized by various mesh size, the width of the remaining portions of the material in a sheet configuration, strand thickness, and strands density. Typically, the mesh covers the entire membrane area whereon it is disposed. The mesh may have a uniform or varying thickness, typically between 0.4 mm and 1.2 mm. The mesh may further have uniform or varying width of the lines between 1.2 and 2.6 mm in a perforated sheet configuration. The mesh may further comprise from 20 to 70 strands per 10 cm of the mesh, e.g. 35 to 63 strands. The strands may be woven at an angle varying from 70° to 110°, e.g. from 80° to 90°. The spacer mesh may comprise polyimide polymer, and may further have a layer of LIG thereon.

The LIG layers may have multiple functions in this setup. The first is that they function as electrodes. Since the LIG may be fabricated on the surface of both sides of the polyimide polymer mesh, a thin layer of polyimide spacer material separates these LIG patterns. Because of the separation, the LIG patterns may be used as spaced-apart electrodes. LIG electrodes may be electrically connected using suitable means for connecting them to a power source with suitable electric potential. The suitable means include, but not limited to for example attachment of wires via a conductive glue to the electrodes. The wires may consist of graphite threads.

By applying a direct current (DC), alternating current (AC), or mixed-pattern current voltage to the electrodes in a saline solution containing sodium chloride (NaCl) or other salts, the functional spacer generates active antimicrobial and antibiofilm components including reactive oxygen species and chlorine-containing elements, and attracts biofouling microorganisms to LIG surfaces. The active chlorine elements include, without being limited to, chlorine ($Cl_2$), hypochlorous acid (HOCl), and a hypochlorite ion ($ClO^-$), are referred to herein as "active chlorine species", and without being limited to hydrogen peroxide ($H_2O_2$), and hydroxyl radicals (HO) as "reactive oxygen species". The active species are generated from conducting ion-containing solutions, e.g. chloride-containing salts in solution, e.g. saltwater, plus a potential difference (voltage) across a component, which generates a current; in some cases LIG may be the current carrier. The active species may eliminate microbial contamination on or near the spacer and thus may prevent biofouling of microorganisms on the membrane, whereas, the electrical current may actively draw the microbes to contact the LIG, or in the near vicinity of LIG, where electrical effects or contact with the LIG cause physical destruction to the cell.

The voltage applied, e.g. for production of active chlorine and oxygen species, may be in the range between 0.05 V to 5 V, preferably between 0.1 V to 3.5 V, inclusive, e.g. 0.5 to 3.0 V. Preferably, said electrical potential may be in the range between 0.5 V and 5 V, e.g. between 1.1 V and 4.5 V, or further preferably, in the range between 1.1 V to 3.5 V, e.g. between 1.5 V and 3.5 V. Generally, the voltage and the duration of the current may be adjusted according to bioload, and/or the sensitivity of the membrane to chlorine and other active species. The electricity may be supplied continuously or on demand. The electricity may be provided for periods of at least 1 second, e.g. for at least 10 seconds, or for at least 30 seconds, or for at least 60 seconds, or for at least 5 minutes, or for at least 15 minutes, or continuously. The current may be supplied responsive to a system monitoring signal, e.g. elevation in total organic carbon (TOC), emergence of microbiota in the system above threshold colony forming units (CFU) count, a drop in system performance such as permeate flux and the like; or may be provided periodically as biofouling prophylaxis.

Without being bound by a theory it is believed that supplying the active chlorine species and or reactive oxygen species onto the spacer, in situ, may allow for high local concentrations to be delivered to the bacteria, particularly driven towards the species by an electric current, while minimizing the exposure to the membrane. It is known that concentration of active chlorine species of above 0.1 parts per million (ppm) is effective at killing bacteria, although higher concentrations may be needed for a biofilm, or solutions with high organic loads; it is also known that staple filter membranes withstand chlorine challenge of 30 ppm for about 300 hours without significant deterioration in their performance. When in use, the spacer can therefore dose the active species such that their concentration remains at ultra low levels. For example, even at a constant excess dose of chlorine of about 0.1 mg/l, a staple membrane would function properly for 90,000 hours (30 ppm*300 h=9000 ppm·h; 9000 ppm·h/0.1 ppm=90,000 hours), i.e. over 10 years. Moreover, as can be seen from the results demonstrated in the examples section, when bacterial load is high, the active species generated are absorbed by the bacteria, making them unavailable for attacking polymer membranes.

The amount of active species may be controlled by adjusting the voltage (higher voltage will generate more active species) or by alternatively turning on and off the voltage (alternatively generating and stopping the generation of active species). The in-situ generation of active species and the ability to control their amount might provide precisely enough antimicrobial components to eliminate or minimize the formation of viable microorganisms, biofouling or biofilm growth. The ability to electrically attract the microbes to the surface of the electrodes, and to control the amount of active species, e.g. active chlorine species and or reactive oxygen species, also limits degradation of nearby membrane materials.

The second function of the LIG on the spacer is that the LIG is antimicrobial, and exhibits antibiofilm function. This also prevents fouling, biofilm growth and bacterial attachment on the spacer. Bacterial survival after contacting the LIG-coated spacer component is generally below 25%, and preferably is below 0.1%. Therefore, in another aspect the present invention is directed to methods of preventing or reducing or minimizing fouling, biofilm growth and/or bacterial attachment on functional spacer, membrane and other elements of water treatment systems.

As used herein the term "water treatment system" or "water treatment device" refers to a system or a device for processing, treating, or generating purified water or a water-based product for a particular application. A water treatment system may be used to generate water having a predetermined, desired, or preferred set of characteristics, qualities, or properties, such as purity, conductivity etc. For example, a water treatment system may include a water treatment facility for generating and distributing potable drinking water for the public, a system designed to generate water for a manufacturing process, a system used to process or treat a water-based substance into a product that may be discharged into the environment, such as, for example, a central wastewater treatment plant, etc. For example, a water treatment system may include any system, plant, or facility that uses equipment based on advanced separation, filtration, dialysis, ion exchange processes, or any other basis, technology, or mechanism for processing, treating, detecting, purifying, isolating, separating, etc., water according to relevant parameters, e.g. for individual home or water source use as well.

The water treatment device may be assembled in a typical spiral-wound membrane configuration. Generally, a lamination of permeate collection boundary layer with a membrane and a feed channel spacer is provided. The spacer may be pre-radiated on both sides with a laser to furnish LIG coating as described herein, or coated with a coating or varnish comprising LIG. An insulated electrode may be thus provided on either surface of the feed channel spacer. The laminate may be wound along an axis and placed into a housing. The permeate collector is in liquid communication with the permeate collection space, and the feed inlet is in liquid communication with the feed channel spacer and the membrane. Insulated electrode wires may be electrically connected each with either of LIG layer of the spacer and insulated from the feed water; the electrodes electrically connected to the conducting layer on the spacer are electrically connected to a power source by an electric circuit, optionally comprising a switch, a relay and/or a controller. Responsive to a signal, e.g. external signal or the relay cycle, the circuit is closed and electricity is supplied via the electrodes to the LIG coatings of the spacer component. Electricity supplied to the electrodes then kills the bacteria, e.g. by attracting the bacteria to the electrode surface, and killing the microbe by electrical effects and or contact with the LIG, by partially converting the chloride ions present in the feed water to active chlorine and by generation of reactive oxygen species on or in the vicinity of the spacer component, and are thus delivered locally to the indwelling bacteria in high concentrations, therefore removing the bacterial fouling.

The following examples are intended to illustrate the present invention without restricting it.

EXAMPLES

Fabrication of Laser-Induced Graphene (LIG)

For LIG, laser induction was conducted on commercial PI film (Kapton®, thickness 0.005 inch, purchased from McMaster-Carr, Cat. 2271K3 (poly (4,4'-oxydiphenylene-pyromellitimide) with a XLS10MWH (Universal Laser Systems) laser platform, equipped with a 10.6 μm $CO_2$ pulse laser (75 W). Several samples were prepared. Samples denoted EL 3-117 and EL 3-146, as described in more detail below, were prepared with the same image density of 8 (1000 pulses per inch), laser duty cycle of 2% and scan rate (rastering speed) of 5% (15 cm/s) were used for all experiments unless stated otherwise.

Figure 1B:
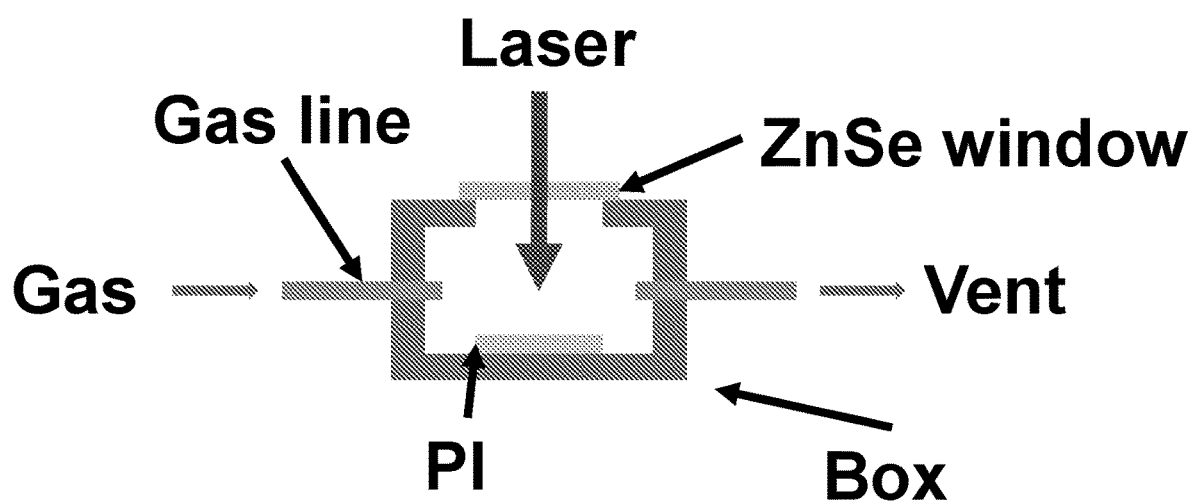
FIG. 1b shows fabrication of LIG with gas box.

For LIG made with gas assist (air or 3% $H_2$/Ar mixture), exemplified in FIG. 1a, a nozzle was used to blow the selected gas towards the laser spot, while the general atmosphere within the laser platform was still air (1 atm). The term "Laser" indicates a laser beam, the term "air" indicates a supply of a gas, exemplified by air, the term "nozzle" indicates a nozzle for supplying gas, exemplified by air, and the term "PI" indicates a substrate, exemplified by polyimide. For LIG made with gas box ($O_2$, air, Ar, or $H_2$), exemplified in FIG. 1b, a gas box was used to allow different gases to flow through the box, and a ZnSe window (thickness 6 mm) was mounted on top of the box to allow the $CO_2$ laser to irradiate the PI film. The terms "Laser" and "PI" are as in the FIG. 1a, and the terms "ZnSe window" indicates a ZnSe window, "Gas line" indicates a gas line, "Gas" indicates a gas supply, "Vent" indicates exhaust, and "box" delineates the gas box. When using the gas box, the flow rates used were ~140 standard cubic centimeters per minute (sccm) for $O_2$, ~140 sccm for air, ~125 sccm for Ar, ~175 sccm for $H_2$, all at 1 atm. Generally, 2% laser duty cycle was used for all samples tested unless specified.

The characterizations for the LIG samples (SEM, TEM, Raman, contact angle, XPS, etc.) are shown in FIGS. 2-6. The following samples were prepared and tested: EL 3-117 I: LIG with air assist (designated as "Air" in FIGS. 2-6), EL 3-117 III: LIG with 3% $H_2$/Ar assist (designated as "3% $H_2$/Ar" in the FIGS. 2-6), EL 3-117 IV: LIG with $H_2$ (box) (designated as "$H_2$ (box)" in the FIGS. 2-6), EL 3-117 V: LIG with Ar (box) (designated as "Ar (box)" in the FIGS. 2-6), EL 3-117 VI: LIG with air (box) (designated as "Air (box)" in the FIGS. 2-6), and EL 3-146: I (LIG: 100% air assist), IV (LIG Ar: Ar in box), V (LIG $H_2$: $H_2$ in box), VII (LIG $O_2$: $O_2$ in box) (designated as "$O_2$ (box)" in the FIGS. 2-6).

Figure 2:
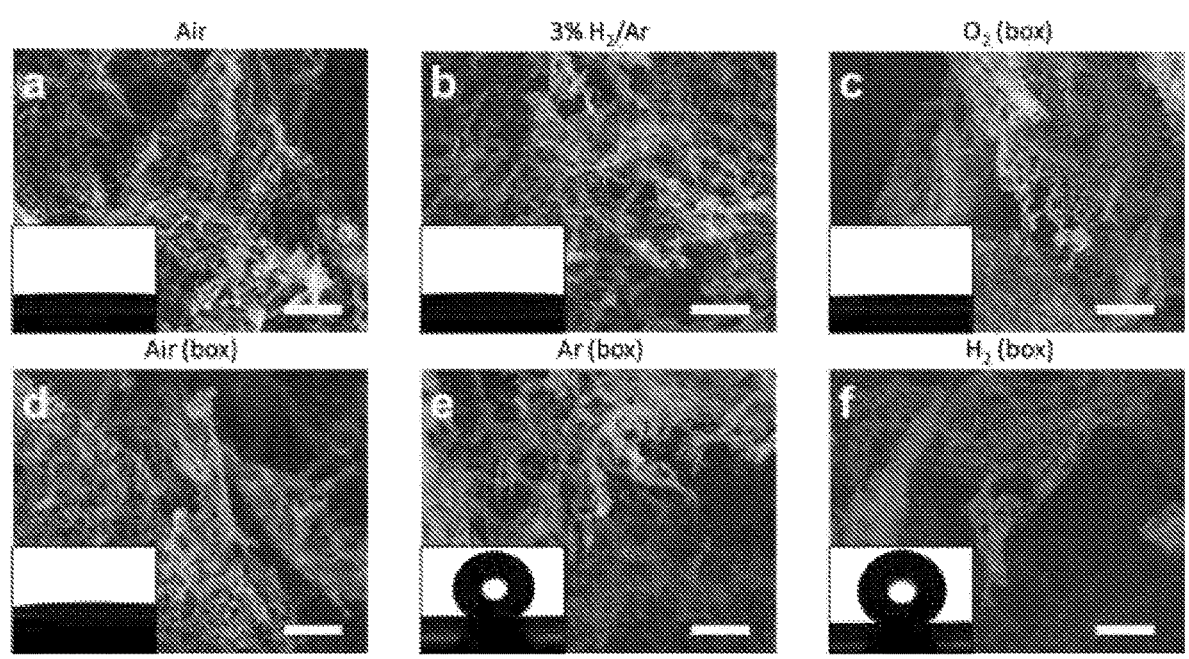
FIG. 2 shows topview SEM images of LIG samples made under different gas atmosphere. Blow through nozzle: (a) air, (b) 3% $H_2$/Ar; Flow through gas box: (c) $O_2$, (d) Air, (e) Ar (argon), (f) $H_2$ (Hydrogen gas). Scale bar: 2 μm. Inset pictures are the water droplet spread or standing on LIG surfaces.
Figure 3:
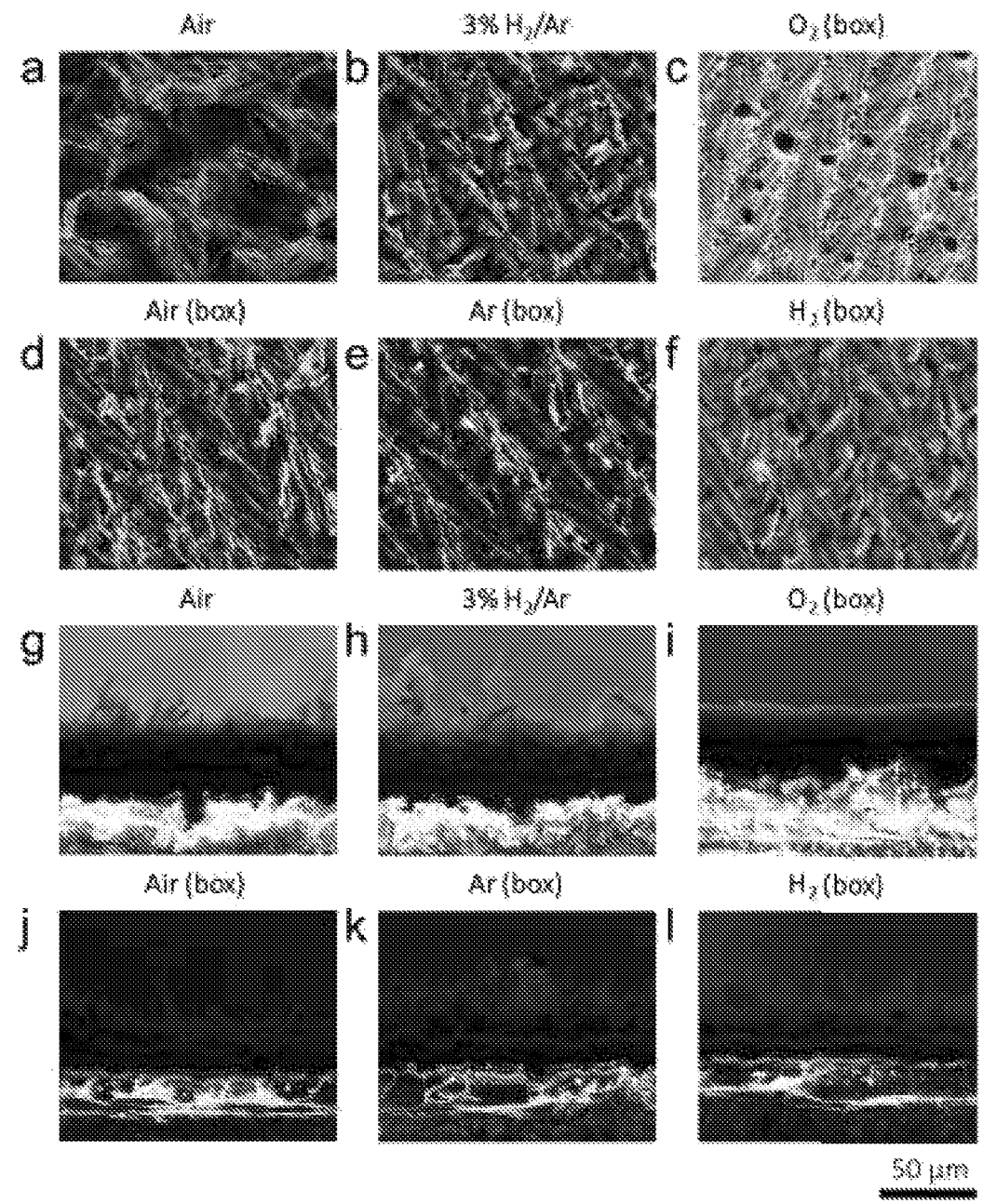
FIG. 3 shows topview (a-f) and sideview (g-l) SEM images of LIG made under different gas atmosphere. A 2% laser duty cycle was used for these samples.
Figure 4:
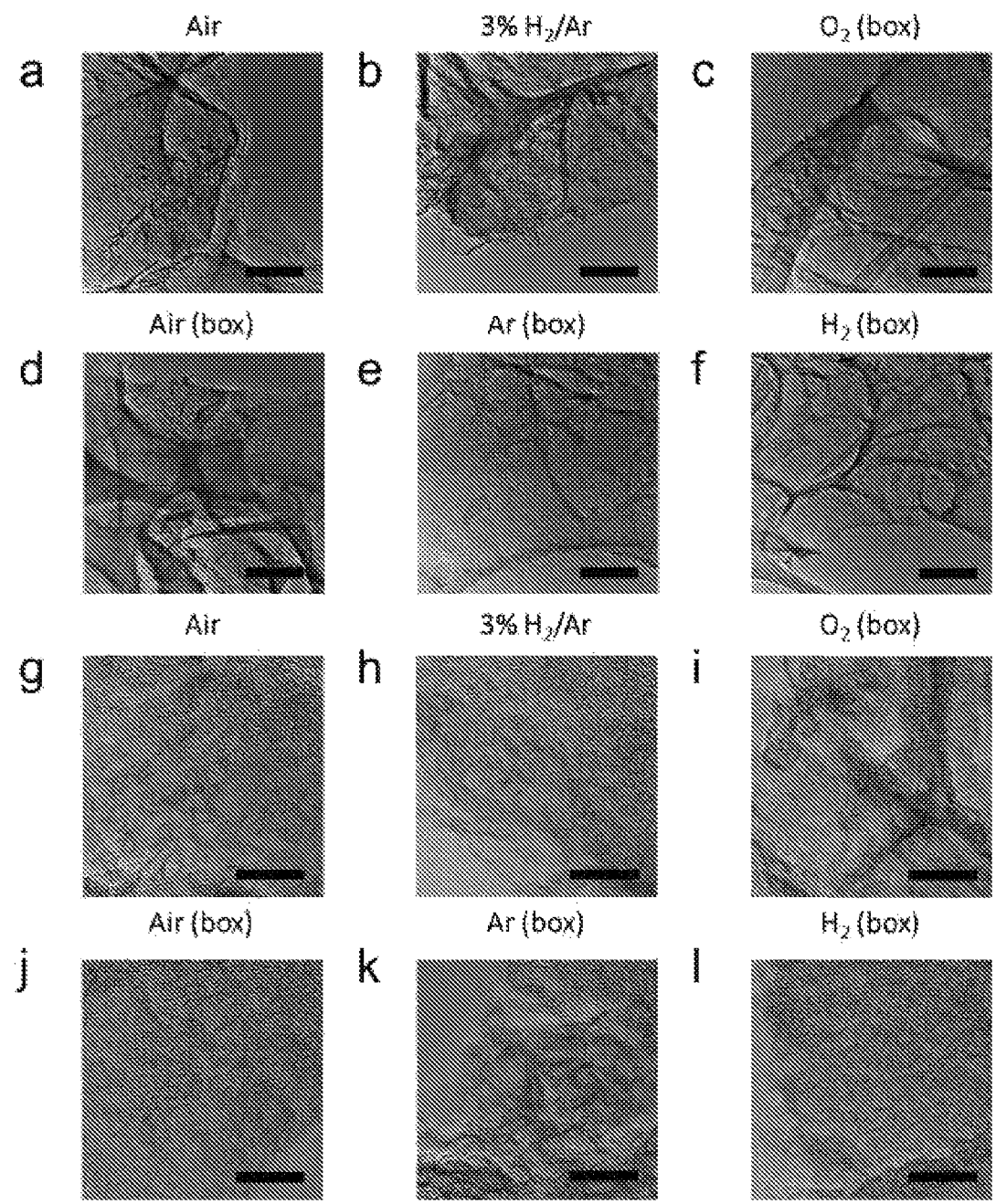
FIG. 4 shows TEM images of LIG made under different gas atmosphere. 2% laser duty cycle was used for these samples. (a-f) Scale bar 200 nm. (g-l) Scale bar 20 nm.

FIG. 2 shows topview SEM images of LIG samples made under different gas atmosphere. Blow through nozzle: (a) air, (b) 3% $H_2$/Ar; Flow through gas box: (c) $O_2$, (d) Air, (e) Ar (argon), (f) $H_2$ (Hydrogen gas). Scale bar: 2 μm. Inset pictures are the water droplet spread or standing on LIG surfaces. FIG. 3 shows topview (FIGS. 3a-3f) and sideview (FIGS. 3g-3l) SEM images of LIG made under different gas atmosphere. FIG. 4 shows TEM images of LIG made under different gas atmosphere, FIGS. 4(a-f) use scale bar of 200 nm, FIGS. 4(g-l) use scale bar of 20 nm. FIG. 5 shows contact angles, designated as "Contact angle (°)" on the ordinate axis of the graph, of LIG samples made under different gas atmosphere with different laser duty cycles. The abscissa axis, designated as "Laser duty cycle (%)", homes values of laser duty cycle used in preparation of the specimens. Dashed line at 1500, as is the minimum contact angle required for superhydrophobicity.

Raman spectra that show characteristics of graphene and included a D peak at ~1350 $cm^{-1}$, a G peak at ~1580 $cm^{-1}$ and a 2D peak at ~2700 $cm^{-1}$. The presence of the 2D peak supports the existence of the single layer graphene sheets. The XPS spectrum of the LIG shows an elemental composition of mainly carbon and oxygen. SEM images were taken with a FEI Quanta 400 ESEM. Transmission electron microscope (TEM) characterizations were performed using a 200-kV JEOL 2100 Field Emission Gun TEM. Raman spectra were recorded with a Renishaw Raman RE01 scope with 633 nm laser. XPS was performed on a PHI Quantera SXM scanning X-ray microprobe with 200 μm beam size and 45° takeoff angle, and calibrated using C is at 284.5 eV. The data are summarized in the FIGS. 6 (a-e). In the FIGS. 6a and 6b, the designations are as described above, and the order of the curves are (from top downwards): Air—3% $H_2$/Ar—O2 (box)—Air (box)—Ar (box)—$H_2$ (box). In the FIG. 6d, the closed circles indicate percentage of O contents, designated as "O content (%)", and the open circles indicate percentage of C—O contents, designated as "C—O content (%)". In the FIG. 6e, the closed circles indicate D/G Raman peaks ratio, designated as "D/G", and the open circles indicate 2D/G Raman peaks ratio, designated as "2D/G".

Fabrication of Laser-Induced Graphene (LIG) Nanofiber

For LIGNF, laser induction was conducted on the commercial PI film (Kapton®, thickness 0.005 inch, purchased from McMaster-Carr, Cat. 2271K3) with a XLS10MWH (Universal Laser Systems) laser platform, equipped with a 10.6 μm $CO_2$ pulse laser (75 W). The same image density of 6 (500 pulses per inch) and scan rate of 10% (30 cm/s) were used for all experiments. A 1% to 5% laser duty cycle was used to get LIGNF with different length. Fluence was calculated by averaging many pulses and measuring the average power using a thermal meter.

Figure 7:
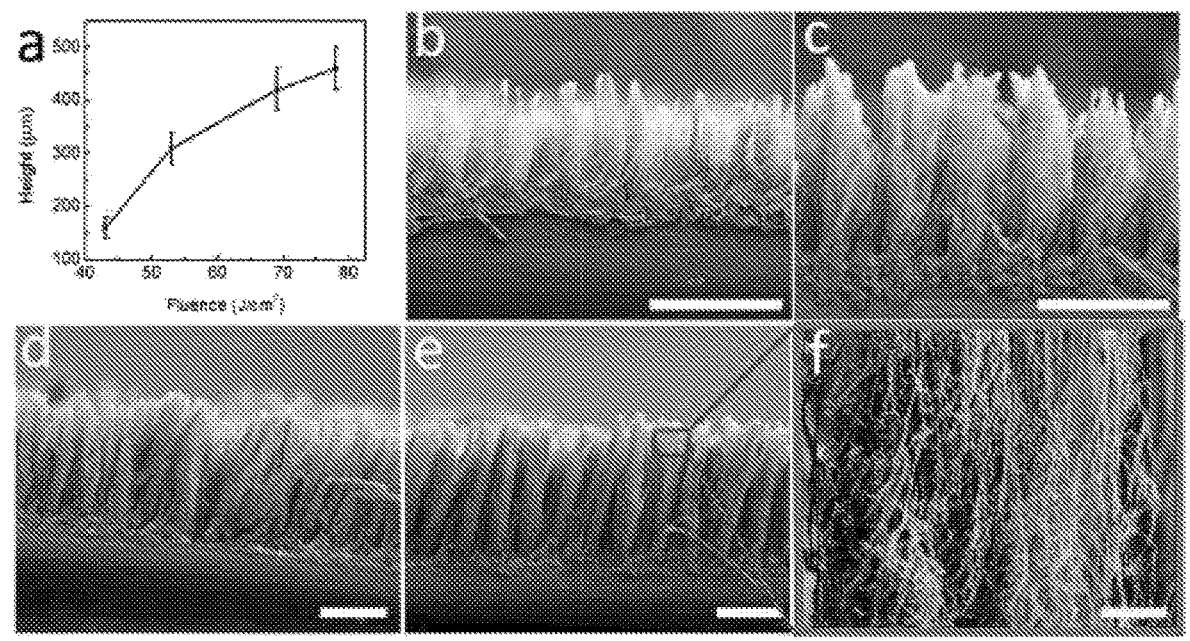
FIG. 7 shows: a) LIGNFs carpet height as a function of laser fluence. SEM images of LIGNFs carpet with fluence of: b) 43 $J/cm^2$; c) 53 $J/cm^2$; d) 69 $J/cm^2$; e) 78 $J/cm^2$; f) 78 $J/cm^2$; scale bar: b, c, d, e: 100 μm; f: 10 μm.
Figure 8:
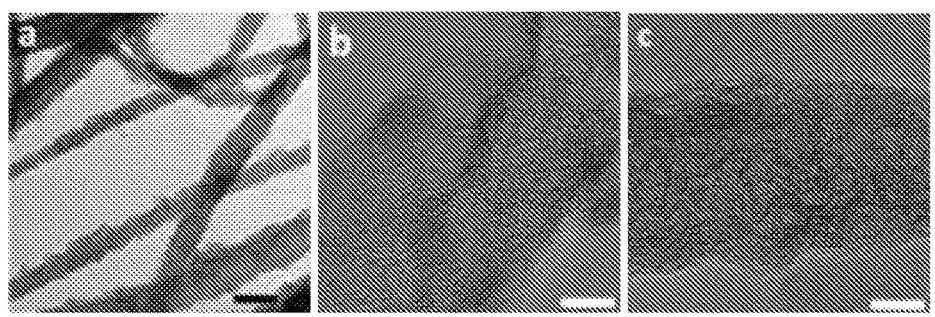
FIG. 8 provides HRTEM images of LIGNFs with widths varying from 30 to 200 nm. Scale bars: a. 200 nm; b and c: 10 nm.
Figure 9:
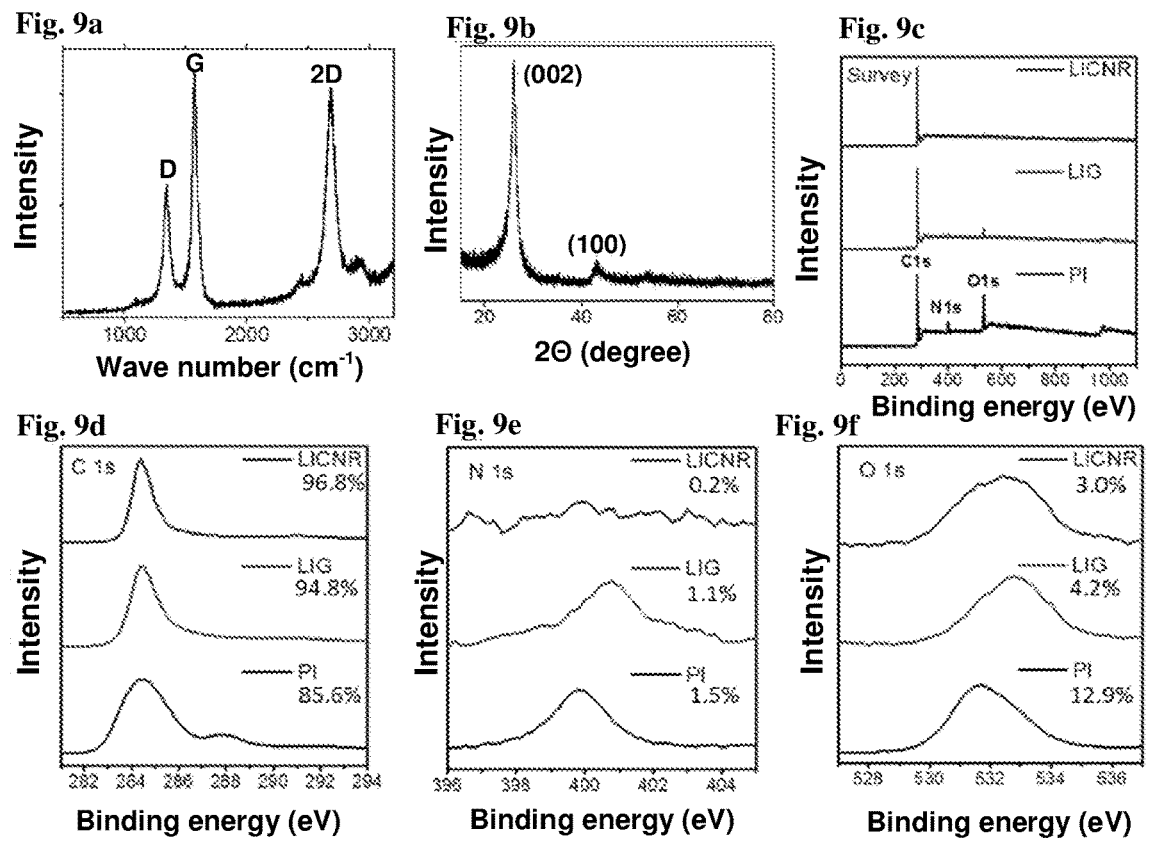
FIG. 9 shows: a) Raman spectrum of LIGNFs showing the D, G and 2D peaks; b) XRD prominent peak is shown at ~26°, representing (002) graphitic crystal planes; sc) XPS survey spectra of PI, LIG and LIGNFs indicating their relative C, N and O content with atomic percentages; d) XPS of C content of PI, LIG and LIGNF; e) XPS of N content of PI, LIG and LIGNF; f) XPS of O content of PI, LIG and LIGNF.

The characterizations for the LIGNF samples (SEM, TEM, Raman, XPS, etc.) are shown in FIGS. 7-9. FIG. 7 shows: a) LIGNF carpet height, designated as "Height (μm)", as a function of laser fluence, designated as "Fluence (J/$cm^2$)". SEM images with scale bar of 100 μm of LIGNF carpet with fluence of: b) 43 J/$cm^2$; c) 53 J/$cm^2$; d) 69 J/$cm^2$; and e) LIGNF carpet with scale bar of 10 μm with fluence 78 J/$cm^2$. FIG. 8 provides high-resolution (HR)-TEM images of LIGs with widths varying from 30 to 200 nm. Scale bars: a. 200 nm; b and c: 10 nm. FIG. 9 shows: a) Raman spectrum of LIGNF showing the D, G and 2D peaks, with peak intensity designated as "Intensity" versus a wave number, designated as "Wave number ($cm^1$)"; b) XRD peak intensity designated as "Intensity", with prominent peak shown at 2Θ of ~26°, designated as ordinate axis "2Θ (degree)", representing (002) graphitic crystal planes; c) XPS survey spectra of PI, LIG and LIGNF indicating their relative C, N and O content with atomic percentages, with peak intensity designated as "Intensity" versus binding energy, designated as "Binding energy (eV)"; d) XPS of C content of PI, LIG and LIGNF; e) XPS of N content of PI, LIG and LIGNF; e) XPS of O content of PI, LIG and LIGNF; with same designations.

Example 1: Contact Bacterial Killing of Laser-Induced Graphene Fabricated on Polyimide A contact killing assay was adopted to examine the bactericidal properties of LIG formed under different fabrication conditions. The assay measured bacterial viability after bacteria were incubated on the surface. For example, such methods have been used to elucidate antimicrobial activities of graphene oxide, previously reported in literature (Castrillón et al., 2015, Environ. Sci. Technol. Lett., 2015, 2 (4), pp 112-117, Interaction of Graphene Oxide with Bacterial Cell Membranes: Insights from Force Spectroscopy).

The samples that have been tested are summarized in the Table A below.

TABLE A

| Sample ID | Vacuum Box | Gas | Contact Angle | Remarks |
|---|---|---|---|---|
| EL 3-117 I LIG/air assist | No | Air | ‡134° | Hydrophilic |
| EL 3-117 III LIG/3% $H_2$/Ar assist | No | 3% $H_2$/Ar | ‡147° | Hydrophilic |
| EL 3 117 IV LIG/$H_2$ (box) | Yes | $H_2$ | †139° | Hydrophobic |
| EL 3 117 V LIG/Ar (box) | Yes | Ar | †140° | Hydrophobic |
| EL 3 117 VI LIG/air (box) | Yes | Air | ‡146° | Hydrophilic |

†by water drop
‡by captive bubble

Figure 10:
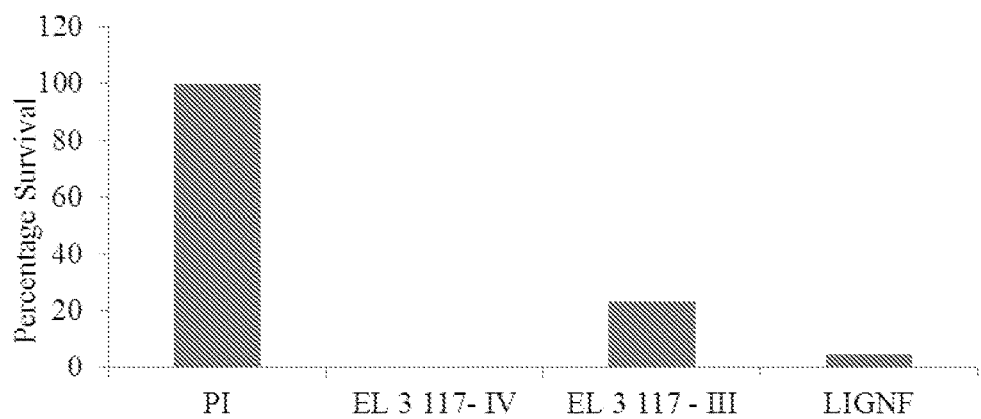
FIG. 10 shows percentage of bacteria surviving on polyimide, LIG and LIGNF (values normalized to polyimide).

A single colony of *Pseudomonas aeruginosa* was added to LB broth (20-45 ml) (Lysogeny broth/Luria Bertani medium—comprised of yeast extract, tryptone and NaCl) in 50 ml falcon tubes. The culture was grown overnight with shaking at 30° C., and the bacteria were pelletted by centrifugation at 4,000 rpm and washed with sterile PBS (2×) (phosphate buffer saline—comprising NaCl, KCl, $K_2HPO_4$, and $Na_2HPO_4$). The optical density ($OD_{600\ nm}$) was found to be 1.236 using a spectrophotometer. The suspension was diluted 10 times by adding 1 ml of this sample to 9 ml of PBS after which the OD was measured to be approximately 0.1. Four samples were tested including polyimide (PI) (control), EL 3 117-IV (LIG/$H_2$ (box), as described in Table A hereinabove), EL 3 117-III (LIG/3% $H_2$/Ar assist, as described in Table A hereinabove), and LIGNF (Laser-induced Graphene 4%, Nanofiber, as detailed hereinabove). 100 µl of diluted bacterial suspension was placed on each of the sample surfaces of ca. 1 $cm^2$, and incubated for 3 hours at 30° C. Then, the samples were washed in 4 ml sterile PBS, and 10 µl aliquot was taken and was spread on an (LB) agar plate. The CFU (Colony Forming Units) were counted manually after 18 hours, for each of the agar plates representing the 4 different samples. The numbers of colonies were normalized to the polyimide control sample to furnish percentage of survival. Results as presented in Table 1 and in FIG. 10, with percentage of survival designated along the ordinate axis as "Percentage survival".

TABLE 1

Bacterial Colony Count Values for Different Samples

| Sample Name | Colony Count 18 hours | Percentage Survival |
|---|---|---|
| Control Polyimide - (PI) | 64 | 100 |
| EL 3 117-IV - LIG ($H_2$ box) | 0 | 0 |
| EL 3 117-III - LIG (3% $H_2$/Ar assist) | 15 | 23 |
| LIGNF | 3 | 4 |

It can be seen that laser-induced graphene (LIG and LIGNF) samples are highly bactericidal when compared with control polyimide.

Figure 11:
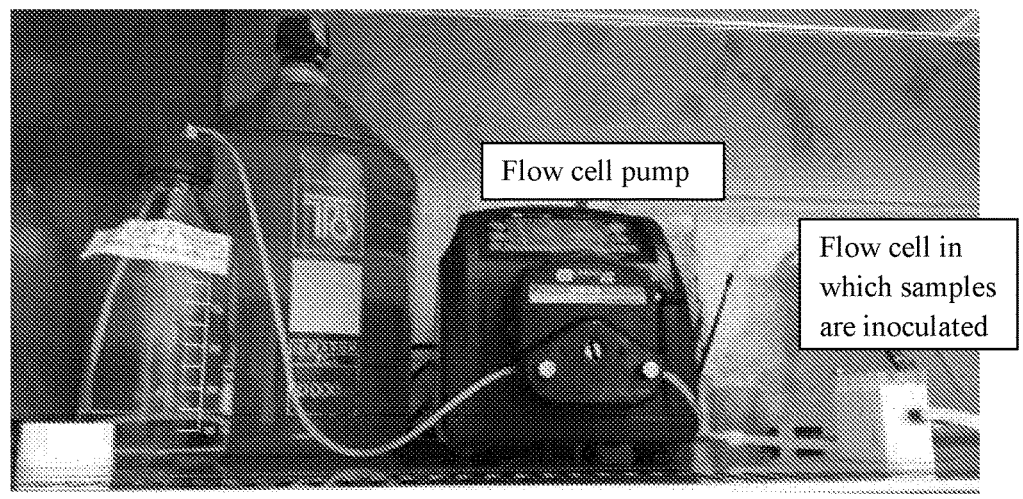
FIG. 11 shows the set-up of flow cell for biofilm growth assay.

Example 2: Biofilm Growth Assay of Laser-Induced Graphene Fabricated on Polyimide, Short-Term and Long-Term Studies The antibiofouling and antibiofilm properties of LIG were observed in a flow cell experiment. The setup for this experiment is seen in FIG. 11, comprising nutrient media, a pump (designated as "Flow cell pump") and flow cell chamber, which contains the samples attached to a glass slide (designated as "Flow cell in which samples are inoculated").

The control polyimide, and/or graphite, and LIG samples were attached to glass slide with double sided tape and were placed inside the flow cell. In general, the samples were inoculated by flowing 50 ml bacteria culture through the flow cell at 2.5 ml/min, followed by up to 96 hours and up to 14 days, of nutrient media. Different experiments were conducted with three different types of bacteria with slightly different variations as detailed below.

1. *Pseudomonas aeruginosa* was cultured as in example 1 above. A 50 ml culture of these bacteria in LB broth with an $OD_{600nm}$ of 0.1 was flowed into the chamber at 2.5 ml/min and out. This was followed by continuous flux of 2.5 ml/min of LB media containing carbenicillin 150 mg/L for up to 96 hours. Carbenicillin was used to inhibit the growth of any interfering bacterial species.

2. *Sphingomonas wittichii* was cultured in a 50 ml bacto-peptone, beef extract, and nutrient broth. The bacteria was flowed into the chamber at 2.5 ml/min and out, and subsequently, waste water from a membrane biological reactor with trace amounts of added bacto-peptone (12.5 mg/l) and beef extract (7.5 mg/l), was flowed between 1-1.5 ml/min for about 96 hours and up to 14 days. Streptomycin was added at a concentration of 150 mg/L.

3. *Enterococcus faecalis* was similarly to *P. aeruginosa* above. A 50 ml culture of these bacteria in LB broth with an $OD_{600}$ of 0.1 was flowed into the chamber at 2.5 ml/min and out. This was followed by continuous flux of 2.5 ml/min of LB media for up to 36 hours.

Staining of the bacteria was performed with a live/dead kit (Invitrogen) by adding 1.5 µl Propidium iodide—to stain dead bacterial cells, 1.5 µl Syto 9—to stain live bacterial cells, and 100 µl fluorescent Concanavalin A, a carbohydrate binding protein (lectin) that adheres to EPS (Extracellular polymeric substances) secreted by bacteria, to 897 µl of 0.1 M NaCl. The samples were stained by adding 2-3 drops of the staining mixture onto the surface, and afterward they were washed with 0.1 M NaCl, and covered under aluminum foil (to prevent any interaction with light from the environment) and imaged using CLSM (Confocal Laser Scanning Microscopy). The biofilm was imaged using Z scanning Multiple areas of the sample were observed, and the results were averaged. The average biomass and biofilm thickness was quantified using MATLAB, with a pre-written program for biofilm image quantification called COMSTAT. IMARIS software was used to visualize and process the CLSM images to reconstruct a 3-D image from multiple microscopy images from a z-scan. Live bacteria, dead bacteria and EPS are colored green, red, and grey in the images.

Figure 12:
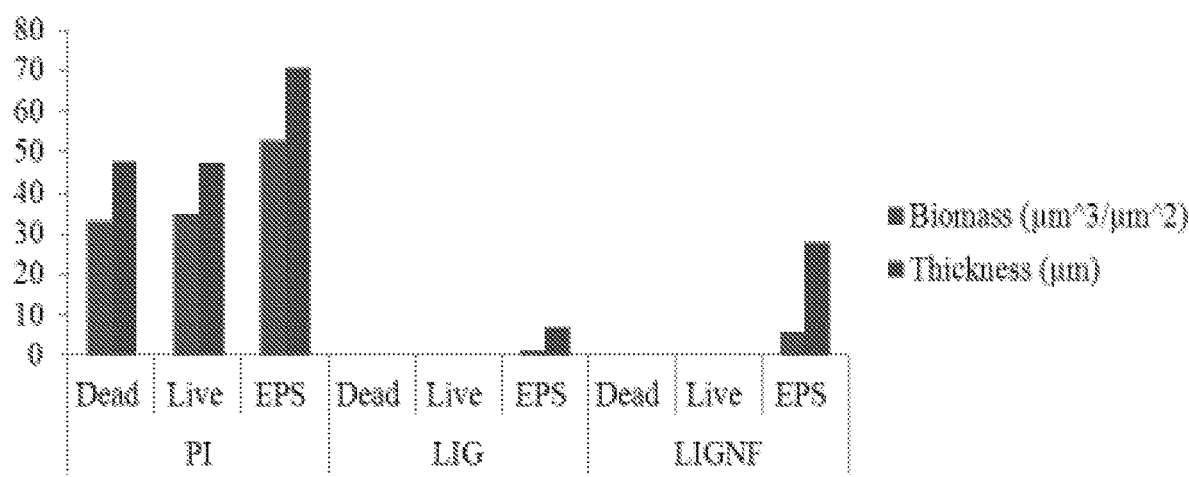
FIG. 12 shows *P. aeruginosa* biofilm parameters for PI, LIG, and LIGNF.

It was readily observed that *P. aeruginosa* biofilm is readily created on PI, but not on LIG, and LIGNF. FIG. 12 shows *P. aeruginosa* biofilm parameters on the substrates of PI, LIG, and LIGNF. The biomass, designated as "Biomass ($\mu m^3/\mu m^2$)", is shown as lighter columns, on the left, and biofilm thickness, designated as "Thickness ($\mu m$)", as darker column, on the right. The dead bacteria, live bacteria and EPS are designated as "Dead", "Live" and "EPS", respectively.

Figure 14:
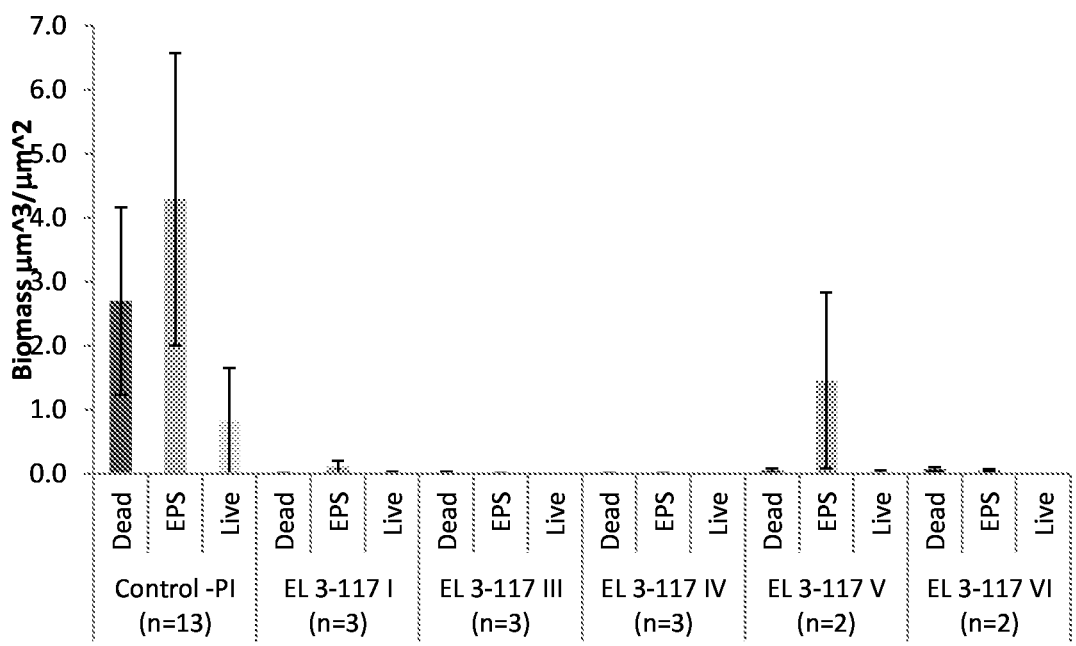
FIG. 14 shows *S. wittichii* biofilm biomass comparison for PI and LIG samples.
Figure 15:
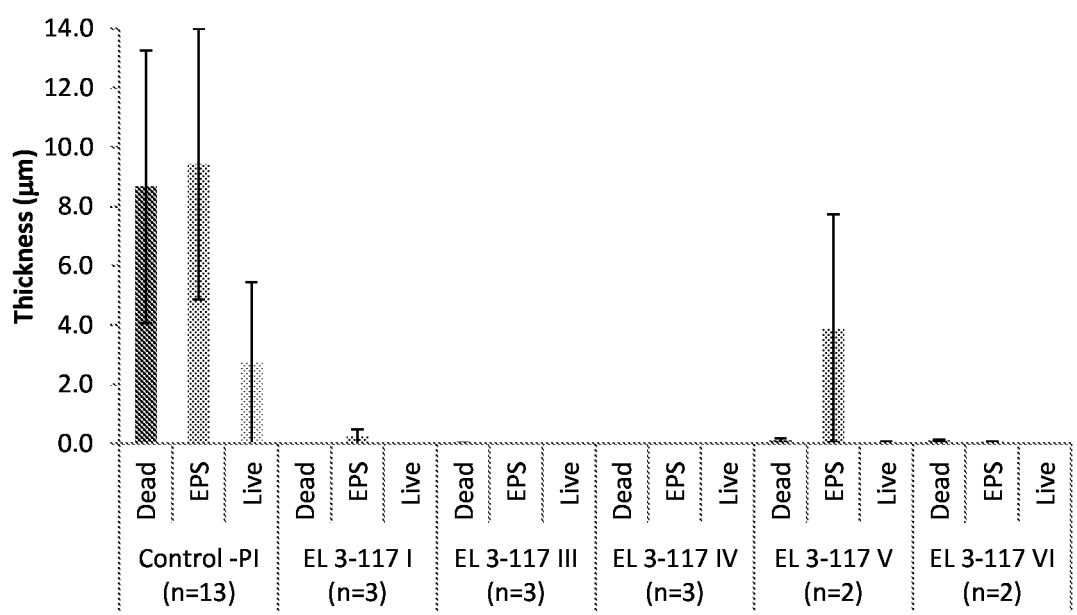
FIG. 15 shows *S. wittichii* biofilm thickness between PI and LIG samples.

It was also readily observed that *S. wittichii* biofilm was readily created on PI, but to much lesser extent or no biofilm was created on LIG samples. FIGS. 14 and 15 show *S. wittichii* Biomass and thickness comparison between PI and LIG samples, with similar designations to *P. aeruginosa* biofilm.

*P. aeruginosa* Biomass & Biofilm Thickness on PI, LIG or LIGNF—96 Hours:

The preliminary experiment was conducted with 3 samples—control polyimide (PI), LIG (Laser-induced Graphene), and LIGNF (Laser-induced Graphene Nanofibers). We observed that polyimide has high density of dead cells (red), EPS (grey), and live (green) bacterial cells, whereas, LIG and LIGNF were almost void of live and dead cells, and with less EPS (Table 2, and FIG. 12).

TABLE 2

Biofilm Parameters - Biomass and Thickness on PI, LIG and LIGNF

|  | PI | | | LIG | | | LIGNF | | |
| --- | --- | --- | --- | --- | --- | --- | --- | --- | --- |
|  | Dead | Live | EPS | Dead | Live | EPS | Dead | Live | EPS |
| Biomass ($\mu m^3/\mu m^2$) | 33.12 | 34.64 | 52.80 | 0 | 0 | 1.28 | 0 | 0 | 5.72 |
| Thickness($\mu m$) | 47.56 | 47.41 | 70.53 | 0 | 0 | 6.69 | 0 | 0 | 27.86 |

TABLE 3

Biofilm Parameters - Biomass and Thickness

|  |  | Biomass ($\mu m^3/\mu m^2$) | Average thickness ($\mu m$) |
| --- | --- | --- | --- |
| PI (n = 9) | Dead | 0.97 | 2.74 |
|  | EPS | 0.19 | 0.11 |
|  | Live | 11.50 | 27.11 |
| Graphite (n = 9) | Dead | 0.16 | 0.21 |
|  | EPS | 18.00 | 31.61 |
|  | Live | 7.43 | 14.99 |
| LIG Ar (n = 9) | Dead | 0.86 | 1.29 |
|  | EPS | 0.04 | 0.02 |
|  | Live | 5.23 | 8.62 |
| LIG H2 (n = 9) | Dead | 0.02 | 0.00 |
|  | EPS | 0.02 | 0.01 |
|  | Live | 0.08 | 0.04 |
| LIG Air (n = 10) | Dead | 0.02 | 0.00 |
|  | EPS | 0.00 | 0.00 |
|  | Live | 0.09 | 0.06 |
| LIG O2 (n = 9) | Dead | 0.02 | 0.01 |
|  | EPS | 1.45 | 2.44 |
|  | Live | 0.21 | 0.37 |

Figure 13:
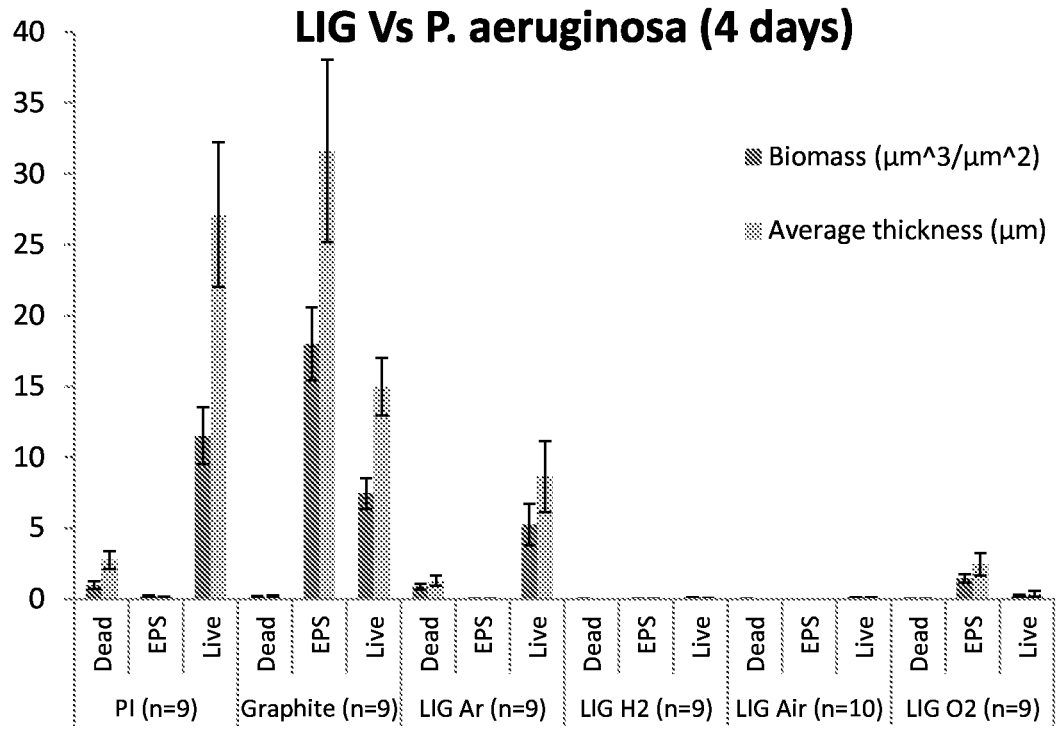
FIG. 13 shows biofilm growth after 4 days (*P. aeruginosa*) on LIG surfaces, compared to PI and graphite.

Another experiment was conducted with *P. aeruginosa* with control polyimide (PI), graphite sheets (PAPYEX-SR, Merson Germany), and 4 types of LIG (Laser-induced Graphene) EL 3-146 I, IV, V, and VII. No cells or EPS were observed on samples 3-146 I (air assist) and V (hydrogen in box). Some cells attachment was observed on IV (Ar) sample, and some EPS were observed on VIII (oxygen) sample. Both PI and graphite substrates contained significant amount of live cells, and graphite also a high amount of EPS. The data are summarized in the Table 3 above, and shown in FIG. 13.

*S. wittichii* Biomass and Biofilm Thickness on PI and LIG Samples—96 Hours:

The second experiment was conducted with *S. wittichii* on control polyimide and 5 different LIG samples, the conditions in which they were made are listed hereinabove (Table A). We found through CLSM image analysis that polyimide has more live and dead bacteria and EPS when compared with LIG samples. CLSM images were quantified for biofilm parameters biomass and average thickness using MATLAB and the results are presented in FIGS. 14 and 15, respectively, and in Table 4.

TABLE 4

*S. wittichii* Biomass with standard error of the arithmetic mean (SEAM)

| Sample | Type | Biomass ($\mu m^3/\mu m^2$) | SEAM | Average thickness ($\mu m$) | SEAM |
| --- | --- | --- | --- | --- | --- |
| Control-PI (n = 13) | Dead | 2.70 | 1.47 | 8.67 | 4.59 |
|  | EPS | 4.28 | 2.29 | 9.42 | 4.57 |
|  | Live | 0.83 | 0.83 | 2.73 | 2.73 |

TABLE 4-continued

*S. wittichii* Biomass with standard error of the arithmetic mean (SEAM)

| Sample | Type | Biomass ($\mu m^3/\mu m^2$) | SEAM | Average thickness ($\mu m$) | SEAM |
| --- | --- | --- | --- | --- | --- |
| EL 3-117 I (n = 3) | Dead | 0.01 | 0.00 | 0.00 | 0.00 |
|  | EPS | 0.11 | 0.10 | 0.24 | 0.24 |
|  | Live | 0.02 | 0.02 | 0.00 | 0.00 |
| EL 3-117 III (n = 3) | Dead | 0.02 | 0.01 | 0.01 | 0.01 |
|  | EPS | 0.01 | 0.00 | 0.00 | 0.00 |
|  | Live | 0.00 | 0.00 | 0.00 | 0.00 |
| EL 3-117 IV (n = 3) | Dead | 0.01 | 0.00 | 0.00 | 0.00 |
|  | EPS | 0.01 | 0.00 | 0.00 | 0.00 |
|  | Live | 0.00 | 0.00 | 0.00 | 0.00 |
| EL 3-117 V (n = 2) | Dead | 0.05 | 0.03 | 0.093 | 0.075 |
|  | EPS | 1.46 | 1.37 | 3.89 | 3.84 |
|  | Live | 0.03 | 0.03 | 0.037 | 0.036 |
| EL 3-117 VI (n = 2) | Dead | 0.07 | 0.03 | 0.10 | 0.04 |
|  | EPS | 0.05 | 0.02 | 0.05 | 0.02 |
|  | Live | 0.00 | 0.00 | 0.00 | 0.00 |

Figure 16:
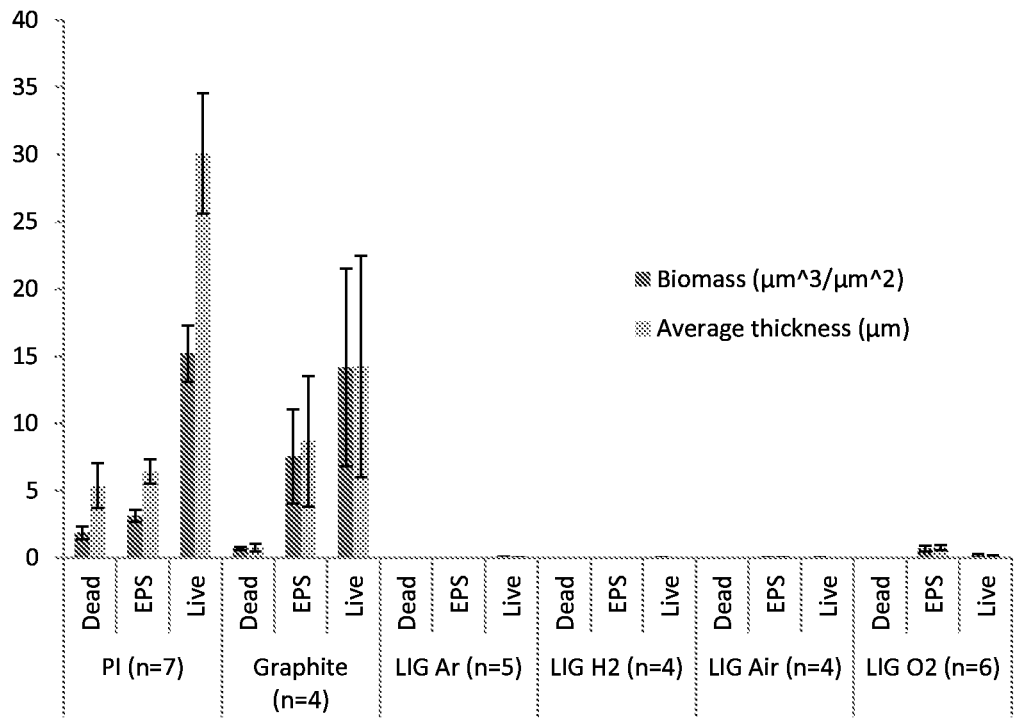
FIG. 16 shows biofilm growth after 14 days (*S. wittichii*) on LIG surfaces compared to PI and graphite.

*S. wittichii* Biomass and Biofilm Thickness on PI and LIG Samples—14 Days:

The third experiment was conducted with *S. wittichii* for 14 days on control polyimide, graphite sheets (PAPYEX-SR, Merson Germany) and 4 types of LIG (Laser-induced Graphene) EL 3-146 I, IV, V, and VII. No cells or EPS were observed on samples 3-146 I (air assist), V (hydrogen in box), and IV (Ar) sample, whereas some EPS were observed on VIII (oxygen) sample. Both PI and graphite substrates contained significant amount of live cells, and a high amount of EPS. The data are summarized in the Table 5, FIG. 16. Designations in the Figure are as explained above.

TABLE 5

Biofilm Parameters - Biomass and Thickness

|  |  | Biomass (µm^3/µm^2) | Average thickness (µm) |
|---|---|---|---|
| PI (n = 7) | Dead | 1.86 | 5.37 |
|  | EPS | 3.11 | 6.42 |
|  | Live | 15.19 | 30.08 |
| Graphite (n = 4) | Dead | 0.69 | 0.77 |
|  | EPS | 7.54 | 8.67 |
|  | Live | 14.15 | 14.22 |
| LIG Ar (n = 5) | Dead | 0.01 | 0.00 |
|  | EPS | 0.01 | 0.01 |
|  | Live | 0.08 | 0.05 |
| LIG H2 (n = 4) | Dead | 0.01 | 0.00 |
|  | EPS | 0.00 | 0.00 |
|  | Live | 0.04 | 0.00 |
| LIG Air (n = 4) | Dead | 0.01 | 0.00 |
|  | EPS | 0.03 | 0.02 |
|  | Live | 0.04 | 0.01 |
| LIG O2 (n = 6) | Dead | 0.02 | 0.00 |
|  | EPS | 0.67 | 0.76 |
|  | Live | 0.17 | 0.12 |

Figure 17:
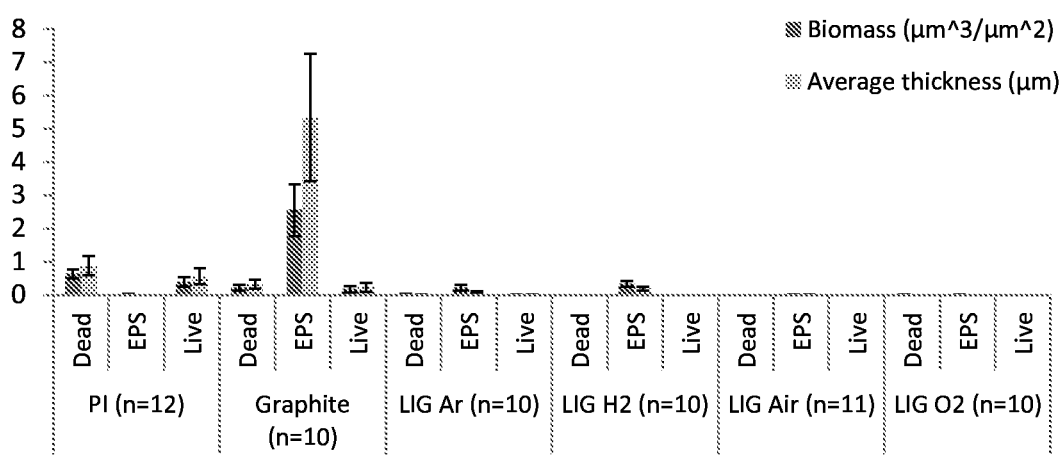
FIG. 17 shows biofilm growth after 36 h (*E. faecalis*) on LIG surfaces compared to PI and graphite.

*E. faecalis* Biomass and Biofilm Thickness on PI and LIG Samples—1.5 Days:

Another experiment was conducted with *E. faecalis* with control polyimide (PI), graphite sheets (PAPYEX-SR, Merson Germany) and the same 4 types of LIG (Laser-induced Graphene) as above: EL 3-146 I, IV, V, and VII. No cells or EPS were observed on samples 3-146 I (air assist) and VIII (oxygen) sample. Some EPS were observed on samples IV (Ar) sample on V (hydrogen in box). Both PI and graphite substrates contained live cells, and graphite also a high amount of EPS. The data are summarized in the Table 6, FIG. 17. Designations in the Figure are as explained above.

TABLE 6

Biofilm Parameters - Biomass and Thickness

|  |  | Biomass (µm^3/µm^2) | Average thickness (µm) |
|---|---|---|---|
| PI (n = 12) | Dead | 0.63 | 0.88 |
|  | EPS | 0.02 | 0.00 |
|  | Live | 0.39 | 0.56 |
| Graphite (n = 10) | Dead | 0.22 | 0.33 |
|  | EPS | 2.55 | 5.34 |
|  | Live | 0.17 | 0.23 |
| LIG Ar (n = 10) | Dead | 0.02 | 0.01 |
|  | EPS | 0.21 | 0.07 |
|  | Live | 0.01 | 0.01 |
| LIG H2 (n = 10) | Dead | 0.00 | 0.00 |
|  | EPS | 0.32 | 0.19 |
|  | Live | 0.00 | 0.00 |
| LIG Air (n = 11) | Dead | 0.00 | 0.00 |
|  | EPS | 0.01 | 0.00 |
|  | Live | 0.00 | 0.00 |
| LIG O2 (n = 10) | Dead | 0.01 | 0.00 |
|  | EPS | 0.01 | 0.00 |
|  | Live | 0.00 | 0.00 |

*P. aeruginosa* Biomass & Biofilm Thickness on PI, Graphite on LIG Spacer:

The same LIG that was used for the LIG spacer was prepared as follows in a 1 cm×1 cm square. A 2% laser duty cycle was used to create the LIG with same settings as for the spacer grid. The image density of 8 (1000 pulses per inch), scan rate (rastering speed) of 10% (30 cm/s), and 100% air assist were used for all experiments.

LIG spacer, graphite surface and untreated PI were tested. In brief, *P. aeruginosa* (PAO1) wild type cultures were grown in Luria-Bertani (LB) broth at 30° C., and harvested and washed with LB broth and diluted to an OD of 0.1 at 600 nm in LB broth. The LIG coated PI samples, a graphite sample and an untreated PI film were attached to a glass slide with double sided tape and vertically placed in the flow cell. The inoculation of the surfaces with *P. aeruginosa* was by flowing 50 mL of bacterial suspension through the flow cell at a rate of 2.5 mL min$^{-1}$, followed by flowing a nutrient media (10% LB) at 2.0 mL min$^{-1}$ for 36 hours.

Propidium iodide (1.5 µL, 20 mM), and SYTO 9 (1.5 µL, 3.34 mM) was added to 0.997 mL of 150 mM sodium chloride for staining dead and live bacteria, respectively. Concanavalin A conjugated to Alexa Fluor 633 dyes (ConA) was used for staining extracellular polymeric substances (EPS). ConA-Alexa Fluor 633 (50 µL mL$^{-1}$) was prepared by dilution of the 5 mg mL$^{-1}$ stock solution in 150 mM sodium chloride. Surfaces were carefully blotted by paper tissue (Kimwipe) to remove excess electrolyte, and then 100 µL of the staining solutions were added to cover the biofilm surface and stored protected from light for 20 min. The surfaces were gently washed (3×) by adding 0.25 mL sodium chloride solution (150 mM) to the surface and then carefully removing excess electrolyte by touching the edges with absorbing paper.

Evaluation of the biofilm was done by confocal laser scanning microscopy (CLSM) (Zeiss LSM 510, META), with Zeiss dry objective plan-NeoFluar (20× magnification and numerical aperture of 0.5). An excitation wavelength of 488 nm was used for both the SYTO 9 and the PI, and 633 nm was used for the Alexa Fluor 633. Biofilm images were prepared by Imaris 3D imaging software (Bitplane, Zurich, Switzerland), and quantitative analysis (biofilm volume and average thickness) was calculated using COMSTAT on Matlab 2015b.

Figure 18:
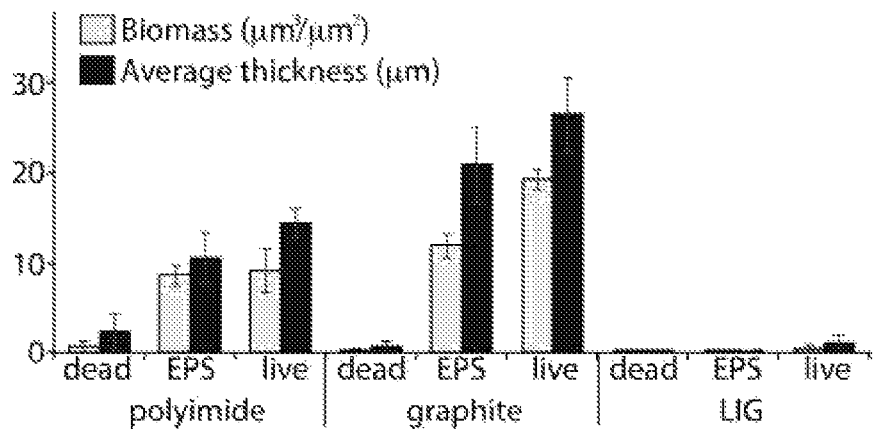
FIG. 18 provides the graph of biofilm growth on the PI, graphite, and LIG surfaces with *P. aeruginosa* showing biomass and average thickness.

We observed that the LIG resisted the formation of biofilm growth without any other influence and almost no biofilm was observed. In contrast, both PI and graphite controls showed large amounts of both live bacteria and extracellular polymeric substances (EPS), and less amounts of dead bacteria. The results are summarized in the FIG. 18. The PI is designated as "polyimide", and graphite paper as "graphite". Other designations are as explained above.

The largest biovolume was observed on graphite and a thickness of up to 26 µm was observed. 3D visualization of the biofilm using IMARIS-Bitplane software showed that dead bacteria were present under the biofilm near the surface of the PI and graphite materials. This layer of dead bacteria suggested that the overlying thick layer of biofilm might have caused unfavorable growth conditions near the surface such as a lack of nutrients. LIG surfaces on the other hand showed extremely low amounts of adhered live bacteria, dead bacteria or EPS, and underlined the potential for use as anti-biofilm surface coatings; a desirable feature for water and wastewater treatment technologies. The contrasting biofilm growth between the LIG surface and the PI substrate was especially observed in images of the boundary regions between the materials.

The hydrophobic nature of LIG, PI and graphite paper were determined and found to be significantly different. Contact angle measurements showed that LIG was the most hydrophilic (45.3°+3.8), similarly to determined above for EL 3-117 I, compared to graphite (61.3°+6.6) and PI (74.5°+3.3). Without being bound by a theory it is believed that a more highly hydrophilic surface can adsorb significantly less hydrophobic components such as hydrophobic EPS components or dissolved organic matter from the solution, which can condition the surface for enhanced bacterial attachment. We observed that EPS was not present on the LIG surfaces. Biomass & Biofilm Thickness on PI, Graphite on LIG Spacer on Secondary Treated Wastewater Secondary treated wastewater was gathered from an aeration pond located at Kibbutz Sde Boker, Israel. The water had composition as detailed in the Table 7 below, and contained $1.6 \pm 0.2 \times 10^4$ CFU mL$^{-1}$ of bacterial phyla Actinobacteria, Bacteroidetes, Firmicutes, Proteobacteria, and candidate phylum TM6. The concentration was determined using the spread plate method. Also, 1 mL of secondary treated wastewater was added to 50 mL LB media followed by incubation for 24 h at 30° C. and the bacteria concentration was adjusted by dilution.

TABLE 7 composition of secondary treated wastewater

|  | Value (ppm) |
|---|---|
| BOD$_5$ | 55 |
| TOC | 122 |
| Nitrogen | 20 |
| Phosphate | 15 |

Figure 19:
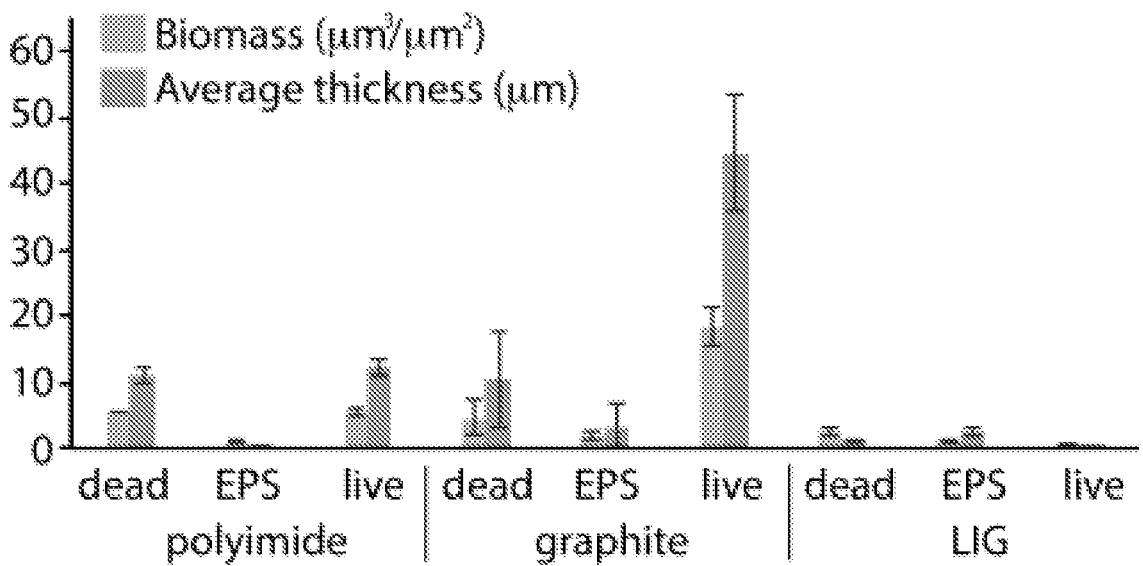
FIG. 19 shows biofilm growth from secondary treated wastewater on LIG spacer, compared to PI and graphite.

LIG spacer preparation, biofilm staining and confocal microscopy were conducted as described above. Biofilm was grown on polyimide sheet, graphite and LIG spacer. The results of biomass in µg/µm$^2$ and biofilm thickness in m are summarized in the Table 8 below, and are demonstrated in the FIG. 19. In the FIG. 19, the biomass column is blue in color and placed on left of the pair, and the thickness column, which is orange in color, is placed on right of the pair, and the designations are as described above.

TABLE 8

Secondary wastewater biofilm parameters - Biomass and Thickness

|  | Polyimide | | | Graphite | | | Graphene | | |
|---|---|---|---|---|---|---|---|---|---|
|  | Dead | EPS | Live | Dead | EPS | Live | Dead | EPS | Live |
| Biomass (µm$^3$/µm$^2$) | 5.51 | 0.95 | 5.45 | 4.58 | 1.89 | 18.26 | 2.25 | 1.07 | 0.37 |
| Average thickness (µm) | 11.08 | 0.21 | 12.16 | 10.31 | 3.36 | 44.35 | 1.12 | 2.25 | 0.02 |

Example 3: Bacterial Toxicity of LIG Particles

Toxicity assays were performed using the LIG as made for the spacer grid (image density of 8 (1000 pulses per inch), scan rate (rastering speed) of 10% (6 inch/s), 2% power, and 100% air assist were used) as fabricated on the PI surface, and compared to LIG powders, made by scraping the same LIG layer from the surface. LIG powders with small and large particle size were prepared by sonication of scraped LIG, which resulted in average particle sheet areas of 0.09 and 0.55 µm$^2$ using AFM, respectively.

LIG powder was made by scraping the LIG from the PI surface. Different LIG powder size distributions were obtained by probe sonication of scraped LIG. Briefly, a stable suspension of LIG powder (2.0 mg mL$^{-1}$ in DI water) was made by immersion in a bath-sonicator (D-74224, Elma Singen) for 30 min. This suspension was then probe sonicated in an ice bath for 120 min at high-intensity (VCX130, Sonics Vibra-cell) for smaller sizes.

A sample of the small sized LIG powder was further oxidized using KMnO$_4$, which increased the oxygen content of the LIG powder from 4% to 31% as measured using XPS. After 120 min of probe sonication, 50 mL of the suspension was centrifuged at 12000×g for 30 min. LIG powder (100 mg) was placed in 5 mL of concentrated H$_2$SO$_4$. Then, KMnO$_4$ (0.75 g) was slowly added in an ice bath. The solution was heated to 35° C. for 2.5 h, and subsequently DI water (10 mL) was slowly added to the suspension. After 2 h, DI water (30 mL) and H$_2$O$_2$ (30%, 5.5 mL) were slowly added to the suspension. The solution was kept for two days at room temperature and the precipitate was collected by centrifugation (12000×g, 30 min) and washed with HCl (10% vol, 3×) and DI water (3×) to remove chemical residues. Different types of prepared LIG powder were deposited on a membrane surface (mixed cellulose esters, 0.025 µm, MF-Millipore Membrane Filter) by filtering a suspension of 5 mL (2.0 mg L$^{-1}$ in DI) onto the membrane filter followed by air drying.

Figure 20:
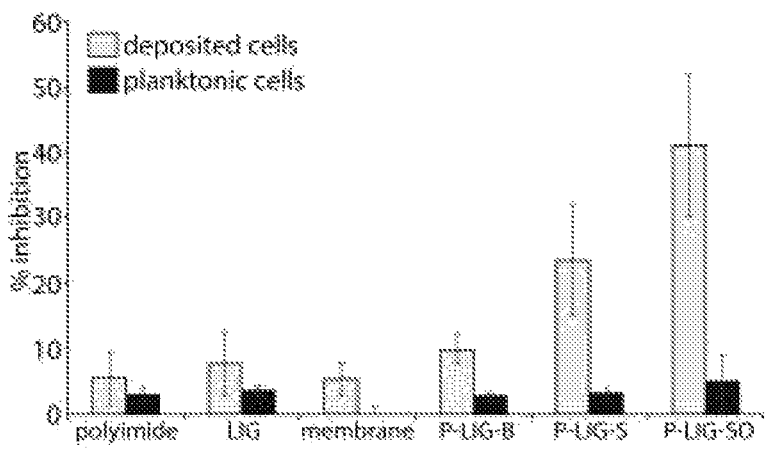
FIG. 20 shows inhibition of attached *P. aeruginosa* on PI, and LIG surfaces compared to mixed cellulose membrane surfaces with deposited LIG powder. Powder-LIG-big particles (P-LIG-B); Powder-LIG-small particles (P-LIG-S); Powder-LIG-small particles, oxidized (P-LIG-SO).

The antibacterial efficacy of the LIG as made on the surface of PI was measured and compared to the LIG powders that were deposited on mixed cellulose filters (FIG. 20). After 6 h of surface contact with a solution of P. aeruginosa, a relatively minor effect was seen for the LIG surface, and the LIG powder with large particle size. The sample with a smaller particle size distribution showed an increase in killing (~23%) of the attached cells, and the LIG powder with small size that was oxidized was the most antimicrobial to attached cells (~41% killing). FIG. 20 shows inhibition of attached P. aeruginosa on PI, and LIG surfaces compared to mixed cellulose membrane ("membrane") surfaces with deposited LIG powder. Powder-LIG-big particles are designated (P-LIG-B); Powder-LIG-small particles (P-LIG-S); and Powder-LIG-small particles, oxidized (P-LIG-SO).

The surfaces were not toxic to cells that did not contact the surface ("planktonic cells", as opposed to "deposited cells"). The smaller particle size of graphene may be more toxic to bacteria as compared to larger particles due to the increased surface area and small edge features, while a higher oxygen content may have led to higher oxidative stress. Thus, the morphology and low oxygen content of the presently fabricated LIG surface on PI films could have contributed to a low passive antimicrobial property. Variable LIG fabrication conditions including laser power and synthesis atmosphere might affect the morphology of the LIG and its oxygen content, thus passive antimicrobial activity might be able to be enhanced on other types of LIG.

Figure 21:
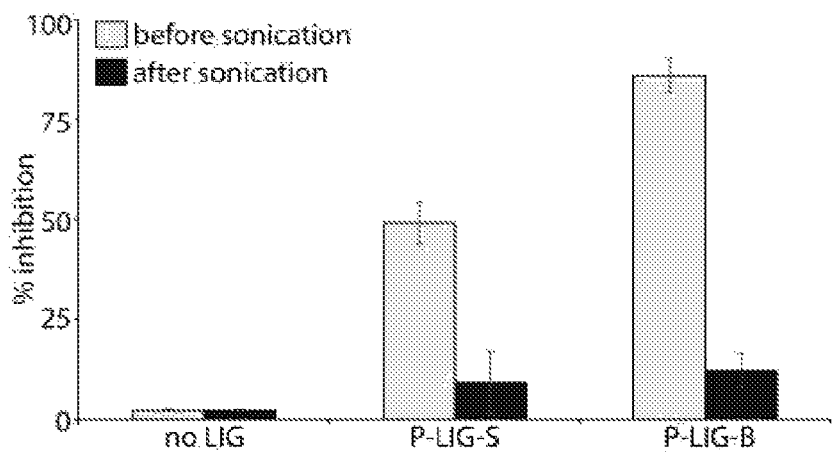
FIG. 21 shows comparison of the antibacterial action in using *P. aeruginosa* in solution with suspensions of powder-LIG-small (P-LIG-S) and of powder-LIG-big (P-LIG-B). A solution without any LIG was used as the control.

The antimicrobial activity of the LIG powders was also investigated in solution for their effect on planktonic bacteria. P. aeruginosa cell suspensions were exposed to 300 µg/L of the LIG powders of different sizes for 6 h, and the bacterial viability was observed using the spread plate method. In experiments performed without a sonication step, the LIG powder with larger sizes initially appeared to be more toxic compared to the smaller particles (FIG. 21). FIG. 21 shows comparison of the antibacterial action in using P. aeruginosa in solution with suspensions of powder-LIG-small (P-LIG-S) and of powder-LIG-big (P-LIG-B). A solution without any LIG was used as the control. However, when the experiment was performed with sonication of the sample (designated "after sonication" and before sonication", respectively) before inoculation on the agar plate, the apparent antimicrobial activity was lost. This suggested that the LIG powders might have covered or entrapped the bacterial cells, which prevented their proliferation. The bacterial cells were not inactivated, but their growth was merely inhibited. Visual confirmation of the antimicrobial activity was seen by staining using Syto9/propidium iodide live/dead kit and imaging using CLSM. Bacterial cells together with small or large LIG powder in suspension showed mostly live bacteria. Bacterial cells and LIG powder were observed to form aggregates and suggested that entrapment of bacterial cells in LIG sheets was possible. Powder LIG deposited on mixed cellulose membrane surfaces showed both live and dead bacterial cells, and the powder LIG (small, oxidized) showed the highest antimicrobial activity.

Figure 22:
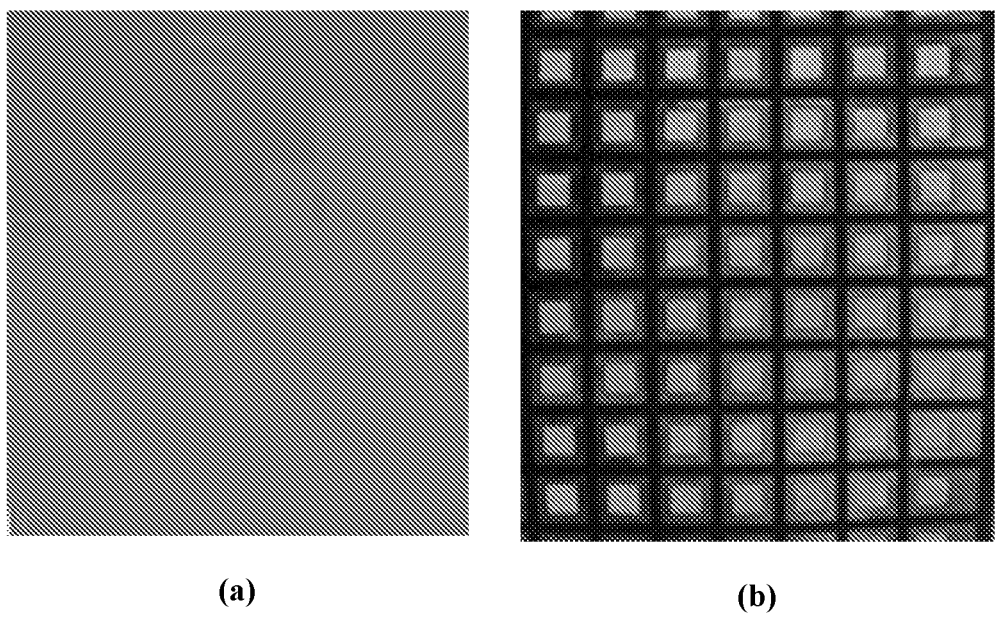
FIG. 22 provides the images of Polyimide Sheet (a) and Laser-induced Graphene (LIG) Fabricated Spacer (b).

Example 4: Spacer Fabrication and Testing Using a DC Voltage of 1.5-2.5 V Using Polyimide Spacer Mesh Material and LIG Coatings on Both Sides of the Polyimide Generated Using 75 W Laser, 2% or 2.5% Laser Power in Air Laser-Induced Graphene Fabricated Spacers:

Kapton® Polyimide (PI) (thickness: 0.005 inch) polymer sheet used in this work was purchased from McMaster-Carr (Cat. 2271K3). Laser scribing on polymer sheets was conducted with a XLS10MWH (Universal Laser Systems) laser platform, equipped with a 10.6 μm $CO_2$ pulse laser (75 W). The image density of 8 (1000 pulses per inch), scan rate (rastering speed) of 10% (30 cm/s), and 100% air assist were used for all experiments. To make a LIG spacer, firstly 12% laser duty cycle was used to make a grid of holes (the size of hole is 3 mm×3 mm, the spacing between holes is 6 mm from center to center) on a PI sheet, then 2% or 2.5% laser duty cycle was used to create a LIG network (line width 1 mm) on the same PI sheet between the holes. A picture of the as-produced spacer is shown in FIG. 22b.

Figure 23:
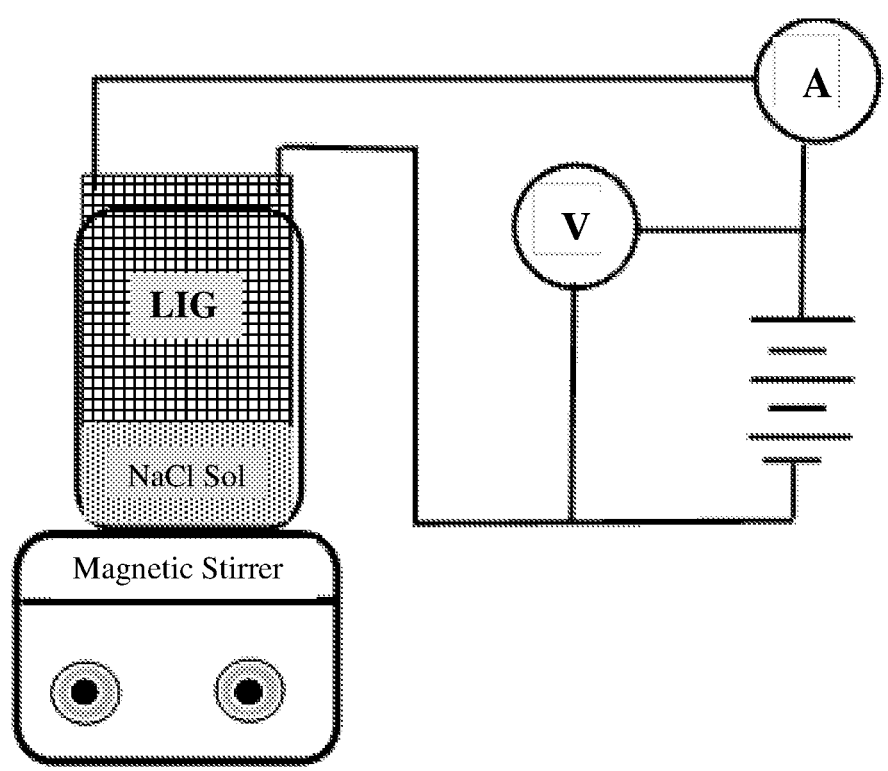
FIG. 23 shows the experimental setup for the IV curve and spacer testing for generation of active chlorine and/or reactive oxygen species.

LIG Spacers:

Polyimide sheet as shown (FIG. 22a) was used for the LIG fabricated spacers. LIG was directly written using the computer controlled $CO_2$ laser on both sides of PI Sheet (10×10 cm) as shown in FIG. 22b. These conducting LIG coatings were used as the electrodes. For the experiments, wires were attached to the electrodes (both sides) by conductive glue. These electrodes were extended with electrical wires and then connected to electrochemical workstation as shown in FIG. 23. In the FIG. 23: the term "Magnetic Stirrer" designates a magnetic stirrer, and "NaCl sol." designates a solution of NaCl.

Current and voltage characteristics for the LIG electrodes were characterized by using the experimental setup as shown in FIG. 23. A direct current (DC) power supply with variable voltage was used for the study. The LIG spacer was partly immersed in 900 ml of 0.08 M NaCl solution in a beaker keeping the wires and conductive glue exposed to the air. The voltage was turned on and varied from 0-2.5 V, and the current and voltage were measured by using multimeters. Either side of LIG electrodes were used for the cathode and anode.

Figure 24A:
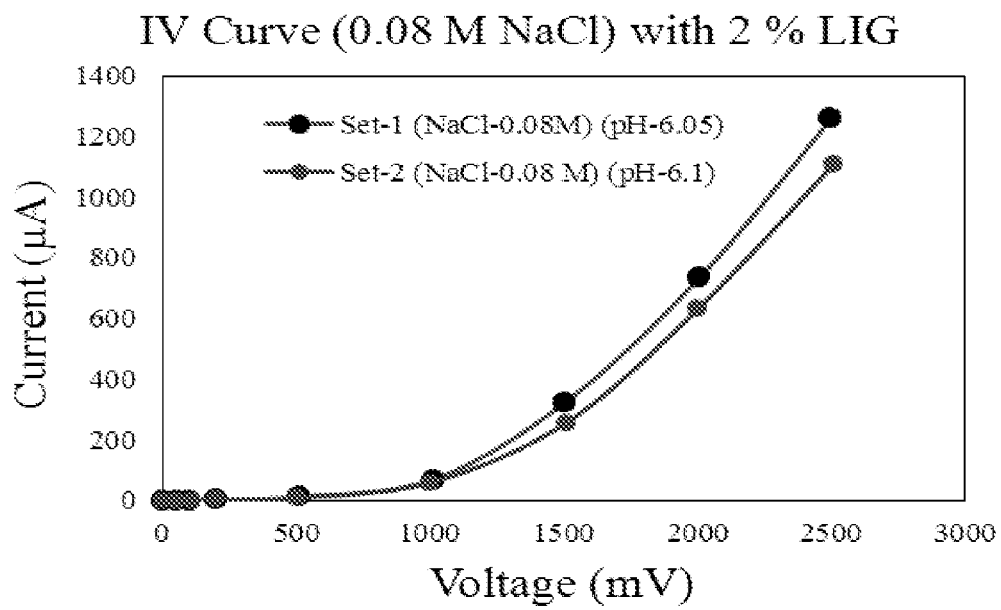
FIG. 24 provides the IV curves for LIG spacers applied to polyimide sheets on both sides in a square pattern in air using: (a) 2.0% laser power (75 W) (identified herein as "2.0% LIG"); and (b) 2.5% laser power (75 W) (identified herein as "2.5% LIG").
Figure 24B:
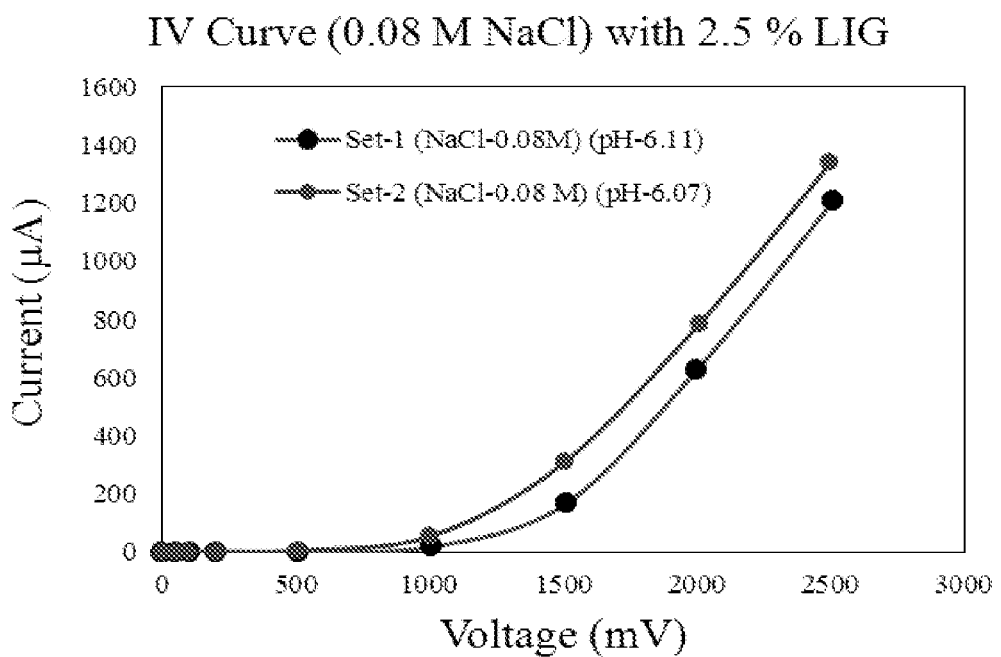

Current-voltage (IV) curves for the "2.0% LIG" and "2.5% LIG" spacer are shown in FIGS. 24a and 24b, respectively. Set-1 (dark filled circles) and Set-2 (light filled circles) are repeated measurements after 12 hours of electrode operation at 1.5 V.

Figure 25A:
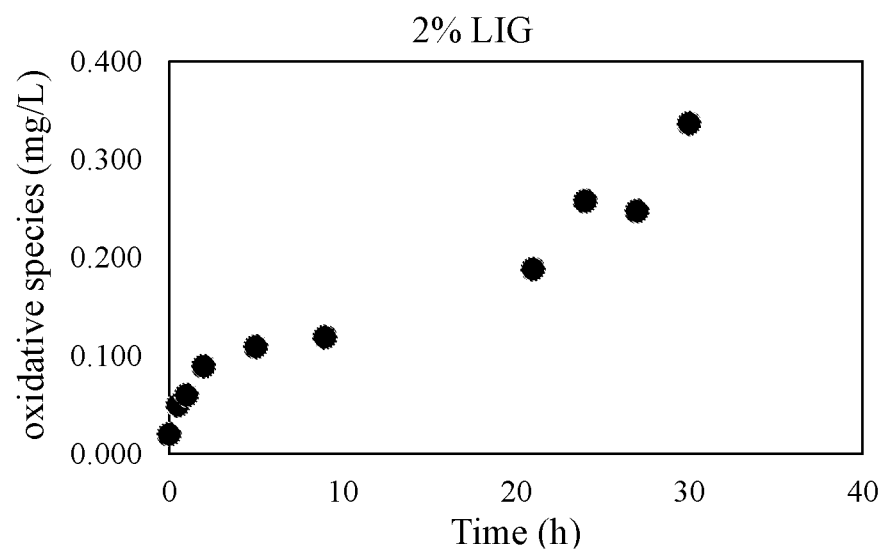
FIG. 25 shows the bulk active oxidative species, represented as "oxidative species" generated with applied voltage of 1.5V by "2% LIG" (a), and by "2.5% LIG" (b).
Figure 25B:
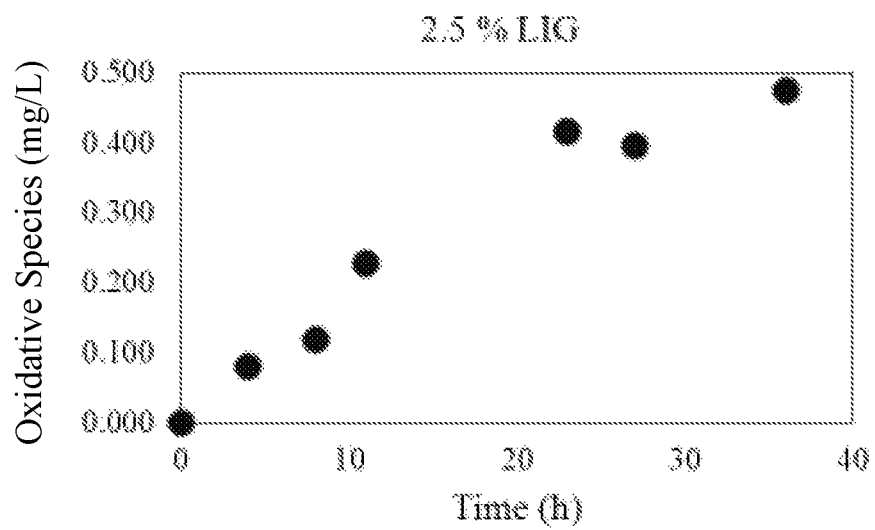

Generation of Oxidating Chemical Species by LIG Spacers:

Evaluation of active chlorine or reactive oxygen species generation by LIG was done in the same setup as shown in FIG. 25, described in the methods above. Total oxidating chemical species concentration was measured by the DPD colorimetric method. DPD (N,N-Diethyl-1,4 Phenylenediamine Sulfate) is an indicator that gives a color after reaction with oxidative species. The DPD kit included tablets that could measure oxidative species in a range of 0.05 to 5.0 mg/L, and was purchased from Sigma-Aldrich (Israel). For an experiment, fresh aqueous NaCl solution (0.08M) was added to the beaker. 1.5 V was applied with LIG spacers fabricated with 2.0 and 2.5% laser power (FIGS. 25a and 25b, respectively). The total oxidative species generation was measured from 5 ml samples taken from the solution. In both cases, the concentration increased with time. Maximum active oxidative species concentration with "2.0% LIG" was 0.34 mg/L after 30 hours of the experiment. Whereas with "2.5% LIG", 0.47 mg/L total oxidative species was measured after 36 hours of operation. According to literature, generally 0.1 to 0.2 mg/L total chlorine concentration is needed for antimicrobial activity and complete sterilization of the solution.

Figure 26:
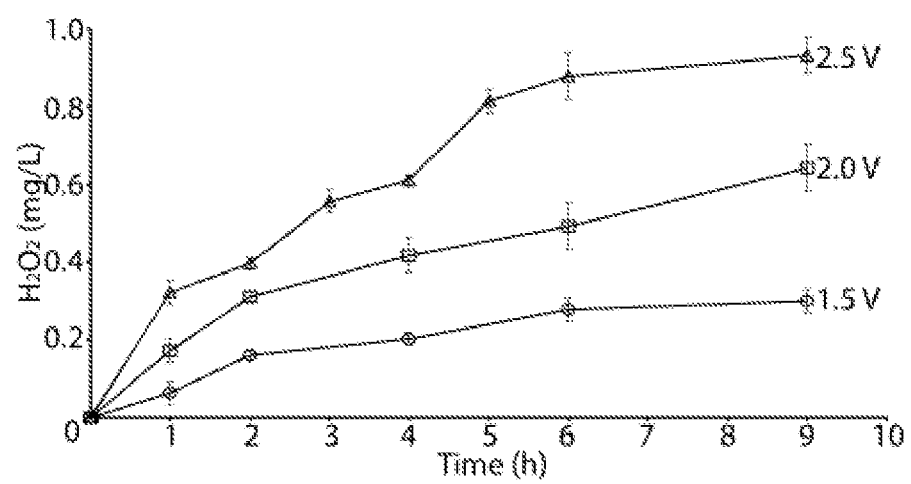
FIG. 26 shows generation of $H_2O_2$ by LIG electrodes at 1.5, 2.0 and 2.5 V measured in bulk solution.

Generation of Active Oxygen by LIG Spacers:

Similarly, evaluation of $H_2O_2$ species generation by LIG was performed. The concentration of $H_2O_2$ was measured for 2% LIG at each voltage in the range of 1.5 to 2.5 V in a pure solution of slightly more diluted 0.05 M NaCl. After 9 h of operation, only 0.3-0.9 mg $L^{-1}$ of $H_2O_2$ was measured. $H_2O_2$ generation occurs at the cathode at 1.23 V, and chlorine formation at 1.35 V. $H_2O_2$ was detected during the experiment, whereas $Cl_2$ could not be detected. The formed chlorine gas might have rapidly reacted with $H_2O_2$, leading to the presence of the dominant species. The results are presented in FIG. 26, measuring the generation of $H_2O_2$ by LIG electrodes in bulk solution at 1.5 (open circle), 2.0 (open square) and 2.5 V (open triangle), with concentration of hydrogen peroxide is given at ordinate axis, designated as "$H_2O_2$ (mg/L)", and the time, in hours, given at abscissa axis, designated as "Time (h)".

Antibacterial effect of LIG spacers:

The antibacterial effect of the spacers was measured by addition of a bacterial culture of P. aeruginosa at high bacterial load (~$10^8$ CFU/ml) or at low bacterial load (~$10^4$ CFU/ml) in the setup seen in FIG. 23. The bacteria were grown in liquid media LB as described above. The culture was grown overnight with shaking at 30° C., and the bacteria was pelleted by centrifugation at 4,000 rpm and washed with sterile PBS (2×) and then the bacteria was suspended in sterile PBS. The bacteria were added to an aqueous solution of NaCl (0.08 M, 900 ml) containing the LIG spacer at high bacterial load (~$10^8$ CFU/ml) or at low bacterial load (~$10^4$ CFU/ml). An electrical potential of 1.5 V was applied and the CFU were monitored over time using spread plate method. Colonies were counted after 24 hours of incubation at 30° C.

Figure 27A:
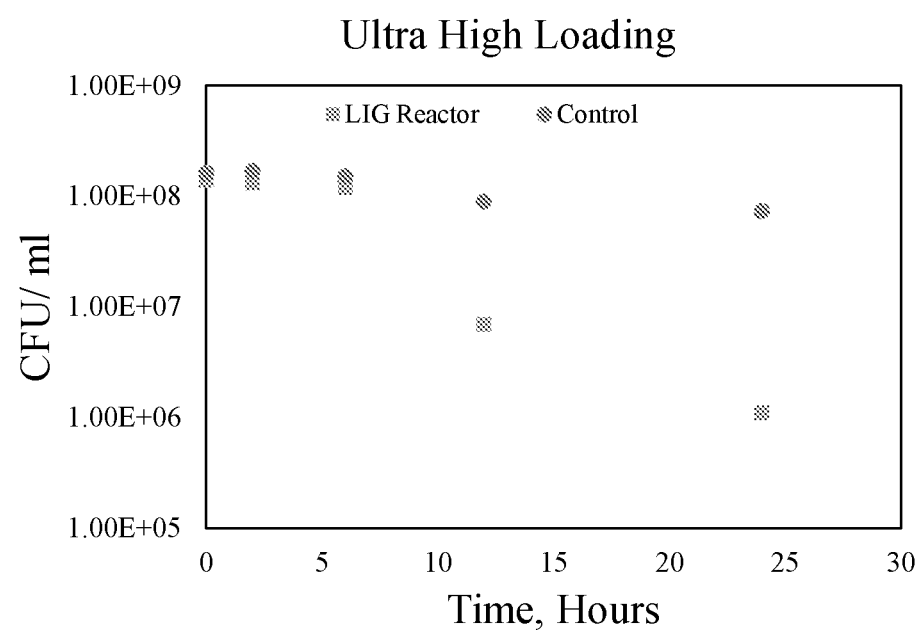
FIG. 27 shows the bacterial population (a) and percentage kill (b) with "2.5% LIG" at 1.5V with ultra-high bacterial population.
Figure 27B:
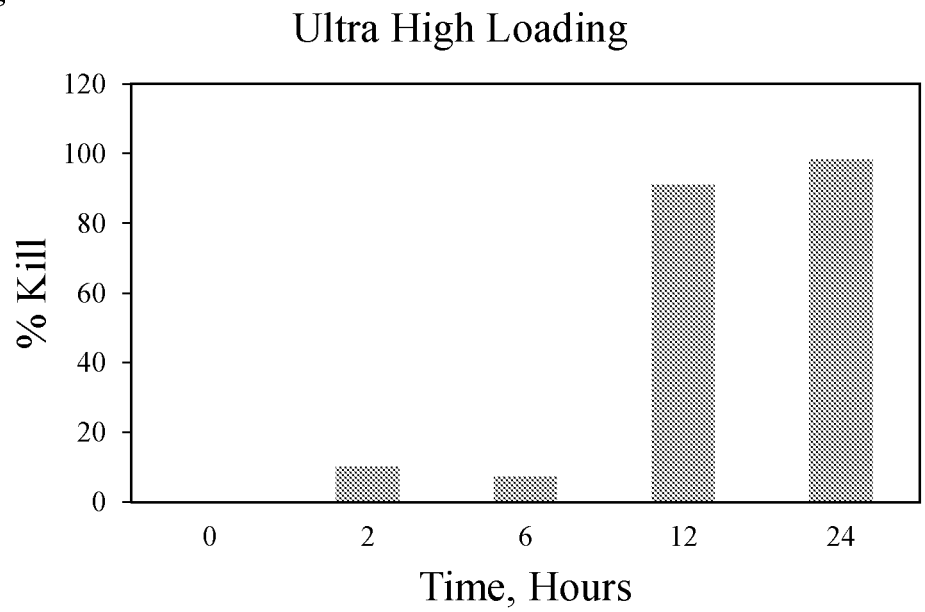

Ultra High Bacterial Loading Experiment:

The change in the microbial population and percentage killing are shown in FIGS. 27a and 27b, respectively. In the FIG. 27a, the solid circle represents control bacterial count, and closed square represents LIG reactor bacterial count. A two log reduction was seen with ultra-high loading after 24 hours operation. Total oxidative species concentration was also measured during the experiment and oxidative chemical species was observed below the detection limit of the kit (0.05 mg/L).

Figure 28A:
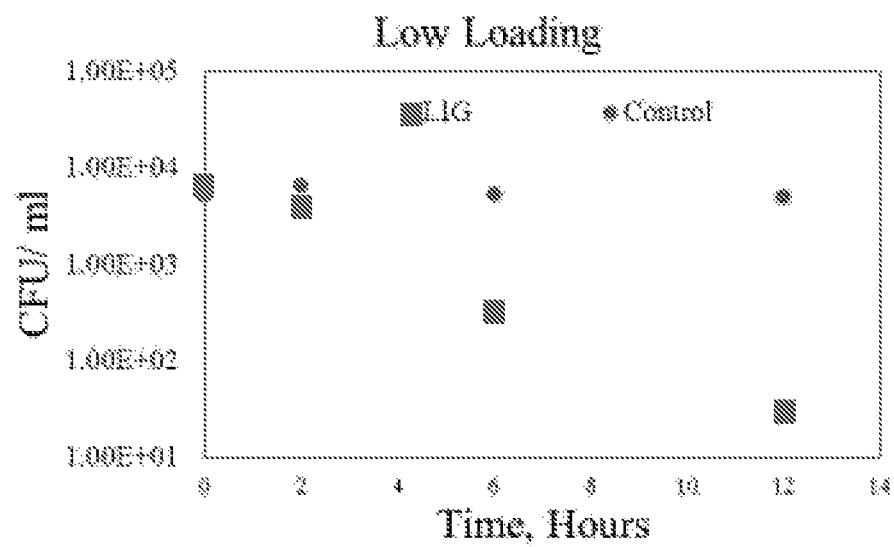
FIG. 28 shows the bacterial population (a) and percentage kill (b) with "2.5% LIG" at 1.5V with low bacterial population.
Figure 28B:
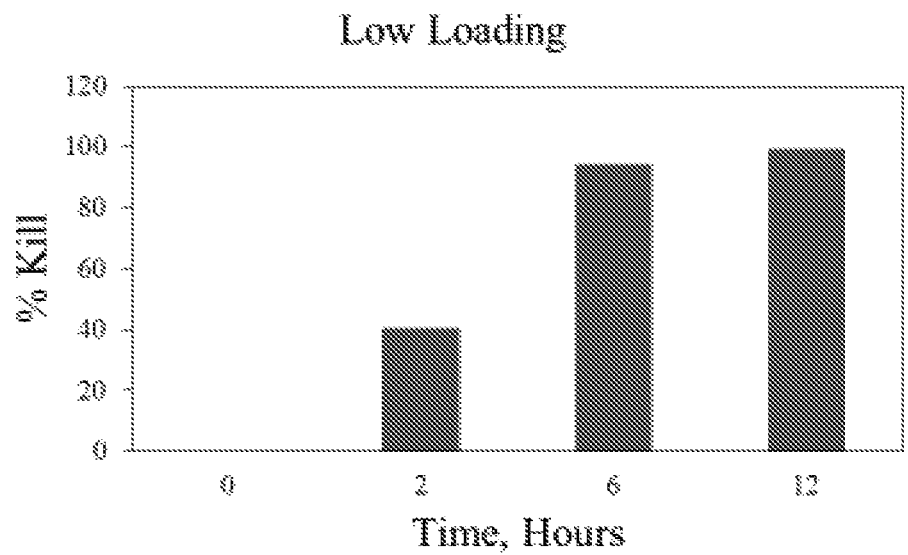
Figure 29:
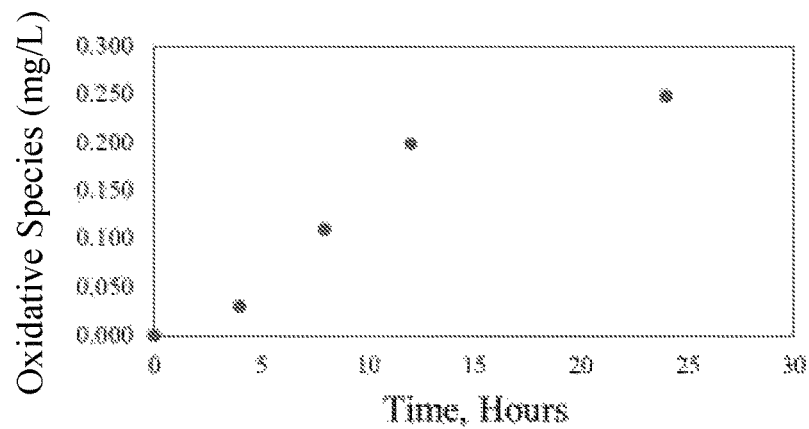
FIG. 29 shows active oxidative species represented as "oxidative species" with "2.5% LIG" at 1.5V with low bacterial population.

Low Loading of Bacteria:

Low loading bacterial experiment results are shown in FIG. 28, with control bacterial counts shown in dark red filled circles, and LIG spacer bacterial counts are shown in light blue filled squares. After 12 hours of operation, 99.99% of microbial populations were killed by the complex killing mechanism of the LIG spacer. Total oxidative species were measured during the experiment and shown in FIG. 29 as shown as chlorine concentration equivalents.

Antibacterial Effect of LIG Spacers—Effect of Voltage:

Similarly, antimicrobial activity of the LIG spacer was observed when used as electrode pairs to which voltages in the range of 1.5 to 2.5 V was applied. A perforated PI sheet 10 cm×7 cm was fabricated as above by laser-cutting square holes (3 mm×3 mm) separated by 3 mm in a grid pattern. LIG (1 mm wide, 2% Laser Power 75 W, 1000 pulses per inch, 30 cm/s) was printed on both sides of the PI sheet between the square holes for a total electrode surface area of 20 cm$^2$. Copper wires were connected to each electrode using a carbon-based glue, and connected to the DC power supply.

The electrode sheet was suspended in a beaker containing an aqueous solution of NaCl (1 µL, 0.05 M) (see FIG. 23). $P.$ $aeruginosa$ cells ($10^8$ CFU mL$^{-1}$) in 0.9% NaCl solution was prepared as described above and added to the beaker for a final concentration of ~$10^4$ CFU mL$^1$ (low loading) and ~$10^6$ CFU mL$^1$ (high loading) with constant stirring at r.t. The power was adjusted to 0, 1.5, 2.0 or 2.5 V, and 1 mL samples were withdrawn from the reactor and used for CFU enumeration or $H_2O_2$/active chlorine species determination. Additionally, at 0 V, the experiment was performed with or without exogenously added $H_2O_2$ for an initial concentration of 1.0 mg L$^1$ of $H_2O_2$ in 0.05 M NaCl solution. $H_2O_2$ concentration was measured by $H_2O_2$/peroxidase assay kit (Amplex® Red, Thermo Fisher), and copper(II) ion and 2,9-dimethyl-1,10-phenanthroline (DMP) method. Active chlorine species measured as described above.

Figure 30:
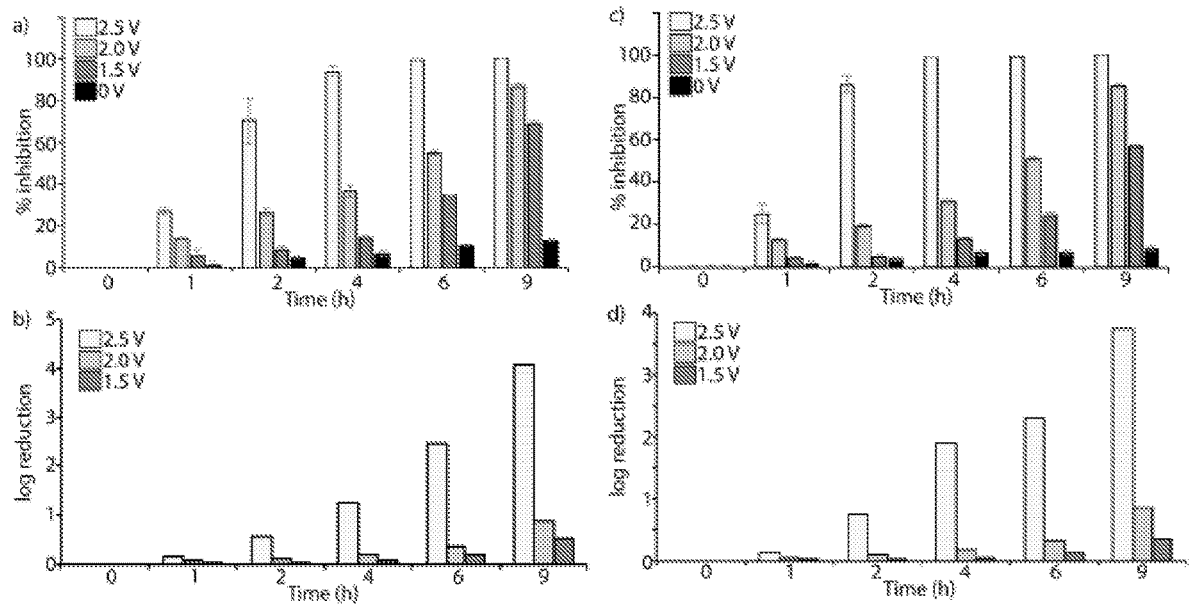
FIG. 30 shows inhibition of *P. aeruginosa* expressed as (a and c) % inhibition and (b and d) Log reduction in the solution at different voltages (2.5, 2.0 and 1.5 V) with (a and b) low~$10^4$ CFU mL$^{-1}$ and (c and d) high~$10^6$ CFU mL$^{-1}$ bacteria loadings, in voltage-dependent experiment. 2% LIG is used.

We observed that the highest voltage applied (2.5 V) was the most effective at eliminating viable bacteria from the tested solutions. More than 99% killing was observed within 4 h of operation. Less activity was seen when 1.5 and 2.0 V were applied; however, these LIG electrodes completely decontaminated (four log reduction) the dilute bacterial solutions at 2.5 V. Similarly, a ~3.5 log reduction was observed in the concentrated bacterial solution. The results are presented in the FIGS. 30$a$-30$b$ for low bacterial loading arm of the experiment, and in the FIGS. 30$c$-30$d$ for the high bacterial loading arm of the experiment.

The $H_2O_2$ concentration was voltage-dependent and ranged from 0.3-0.7 after 6 h of operation in the experiment with the dilute bacterial solution. However, at all voltages measured, $H_2O_2$ was below the detection limit in the experiments using concentrated bacterial solution. The high amount of bacteria and associated organic matter most likely consumed the free $H_2O_2$. The toxicity of 1 mg L$^{-1}$ $H_2O_2$ exogenously added to $P.$ $aeruginosa$ cultures was assessed with LIG electrodes present at 0 V (open circuit voltage). The viability was not affected in either dilute or concentrated solutions of bacteria. Without being bound by a theory it is believed that when active species, including $H_2O_2$, are generated by the electrodes, the local concentration near the electrode surface is expected to be much higher than the measured bulk concentrations.

Example 5: Active Antimicrobial Activity of LIG Electrodes—Epifluorescence Microscopy Study The electrical effects were evaluated using a special LIG electrode configured for use under the microscope. The conditions for LIG fabrication were the same as the spacer LIG. A channel of 100 µm between the electrodes (0.4 cm×1 cm) was designed so that both the cathode and anode could be observed simultaneously.

Figure 31:
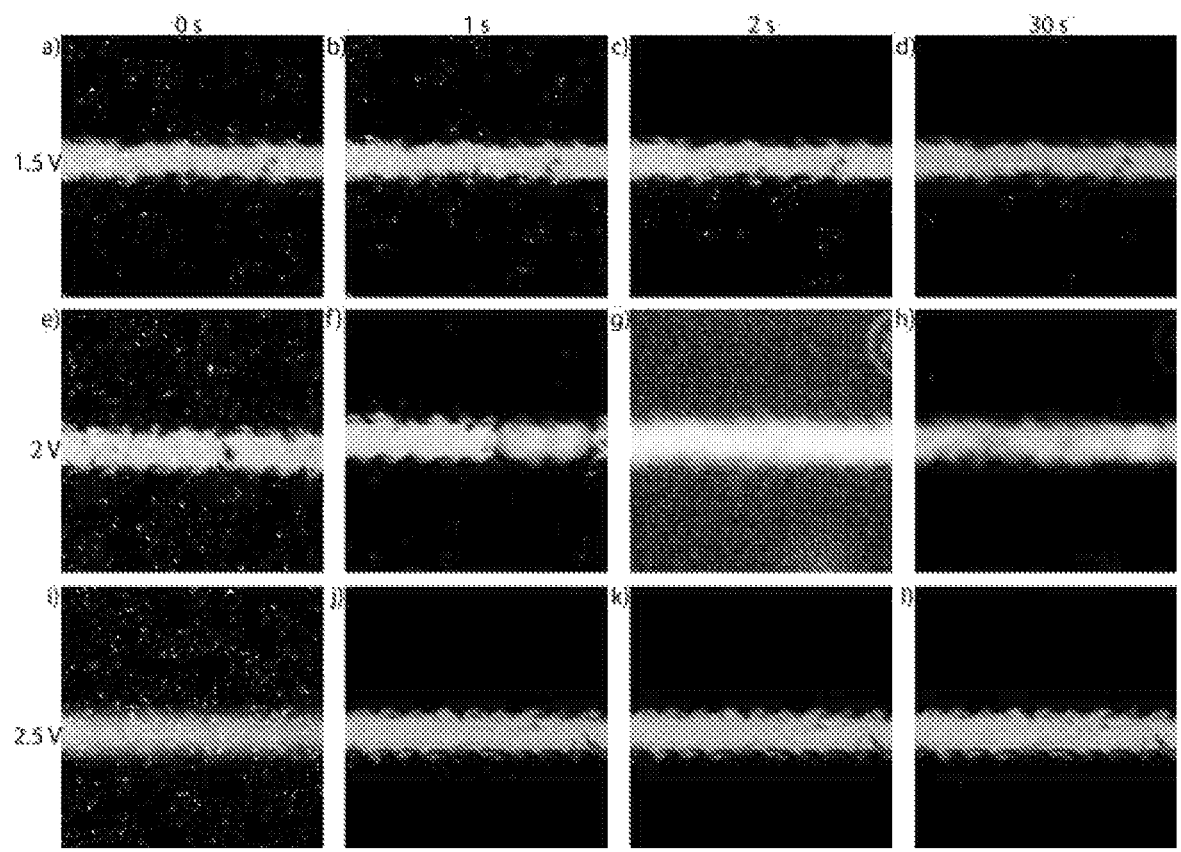
FIG. 31 shows GFP-tagged *P. aeruginosa* were observed using epifluorescence microscopy on electrodes made of 2% LIG at different times. Voltages (1.5-2.5 V) were applied and images were captured up to 30 seconds ("30 s"). In each image, the anode (top) was separated from the cathode (bottom) by a 100 μm channel. GFP tagged *P. aeruginosa* were observed as bright dots.

A suspension of $P.$ $aeruginosa$ expressing GFP was added to the top of the electrodes and was monitored as a function of time at different voltages (FIG. 31). When no voltage was applied, the bacteria were unaffected and persisted in the solution. However, upon applied voltages above 1.1 V, bacterial movement towards the anode was observed, and subsequent disappearance of the cells was seen between 1.5-2.5 V. At 1.1 V, no bacterial disappearance was seen after 30 s, however the disappearance of bacteria was increasingly pronounced and correlated to the increase in voltage from 1.5 to 2.5 V. For example, at 1.5 V, bacteria began to disappear at the anode side after 1 s, and the bacteria also began to disappear from the cathode side after 2 s, with almost complete disappearance of the bacteria at 30 s. Faster disappearance of bacterial cells was seen at higher voltages 2.0 V and 2.5 V, where almost complete disappearance of the bacteria was observed after 1 s.

Figure 32:
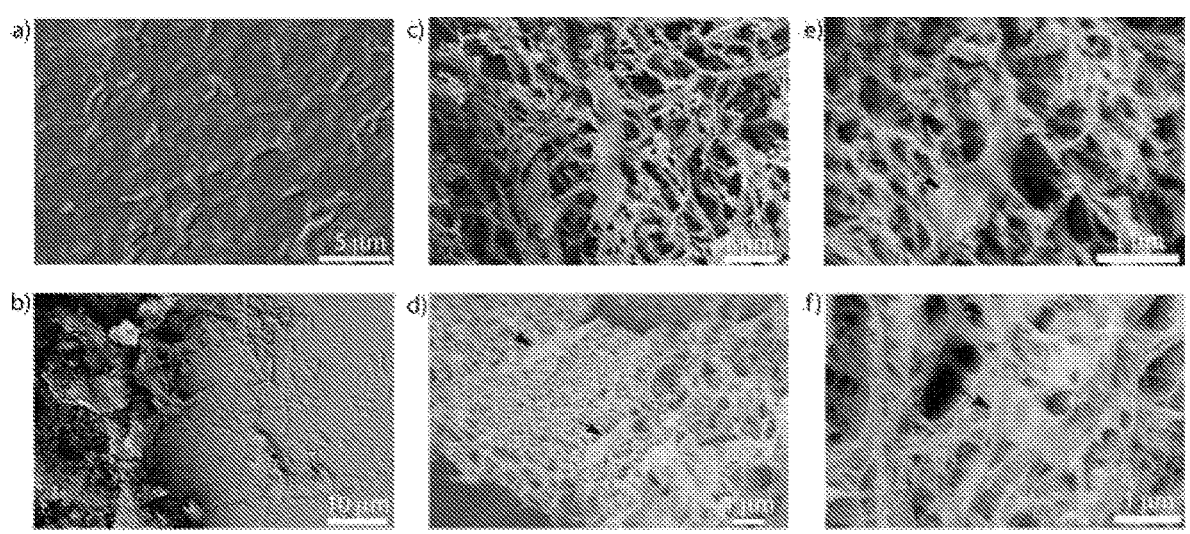
FIG. 32 shows *P. aeruginosa* visualization on 2% LIG electrodes using SEM after application of 1.5 V for 30 s, as described in the Example 4. (a) Bacteria at a PI surface (without electricity); (b) Bacterial cells seen in the PI channel between the LIG electrodes. (c-d) Damaged bacterial cells (elongation) at anode; (e-f) Damaged bacterial cells at the cathode; arrows indicate bacteria.

Without being bound by a theory it is believed that the movement of bacteria towards the LIG surfaces and their subsequent disappearance indicate that the electrical effect, e.g. irreversible electroporation, in combination with a surface toxicity effect and localized active chemical species generation may be the most plausible explanation for the "active" mode of antibacterial action of the LIG surfaces. $P.$ $aeruginosa$ cells have a negative surface charge due to negatively charged biomolecules present in the cell membrane such as phospholipids and polysaccharides, and this could be attracted towards the anode. The demonstrated instantaneous destruction of the cells suggests a rapid physical destruction of the cell wall or cell membrane components. This is supported by SEM images taken on the electrodes, presented in the FIGS. 32$a$-32$f$.

Comparing to graphite electrodes configured in the same way, the movement of bacterial cells began only at 2.3 V, and disappearance of bacteria was observed only above 2.6 V.

Example 6—Active Antimicrobial Activity of LIG Electrodes on Wastewater

Secondary treated wastewater was used as in Example 2. Diluted secondary wastewater was prepared by diluting the wastewater with de-chlorinated tap water, 1:10. The wastewater cultures were adjusted to $10^4$ and $10^6$ CFU mL$^{-1}$, by incubating the secondary treated wastewater at 30° C. until the concentration was achieved.

Figure 33:
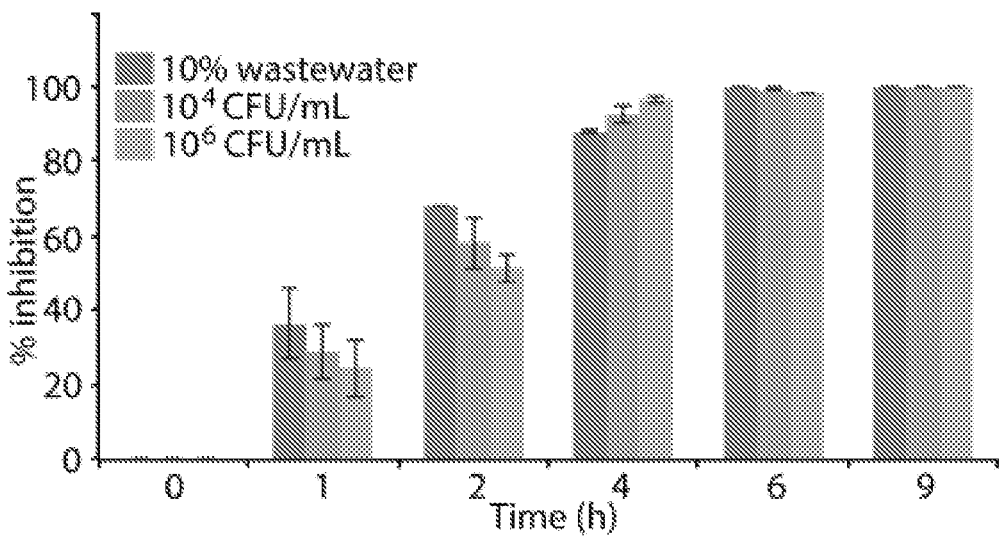
FIG. 33 shows inhibition of mixed-culture biofilm, expressed as % inhibition in from secondary treated wastewater, and with low (~$10^4$ CFU mL$^{-1}$) and high (~$10^6$ CFU mL$^{-1}$) bacteria loadings, as described in the Example 6.

LIG spacers and the experimental setup were as described in the Example 4. Voltage of 2.5 V was applied for 9 hours, and in all cases >99.9% bacterial inhibition was observed. The results of inhibition percentage, designated as "% inhibition", versus time, designated as "Time (h)", are presented in the FIG. 33. The columns presented are as follows, from left to right: 10% wastewater (darkest column), $10^4$ CFU/mL (lighter column), and $10^6$ CFU/mL (lightest column).

Example 7—Cross-Flow RO Assembly with Antibiofouling Spacer

Figure 34:
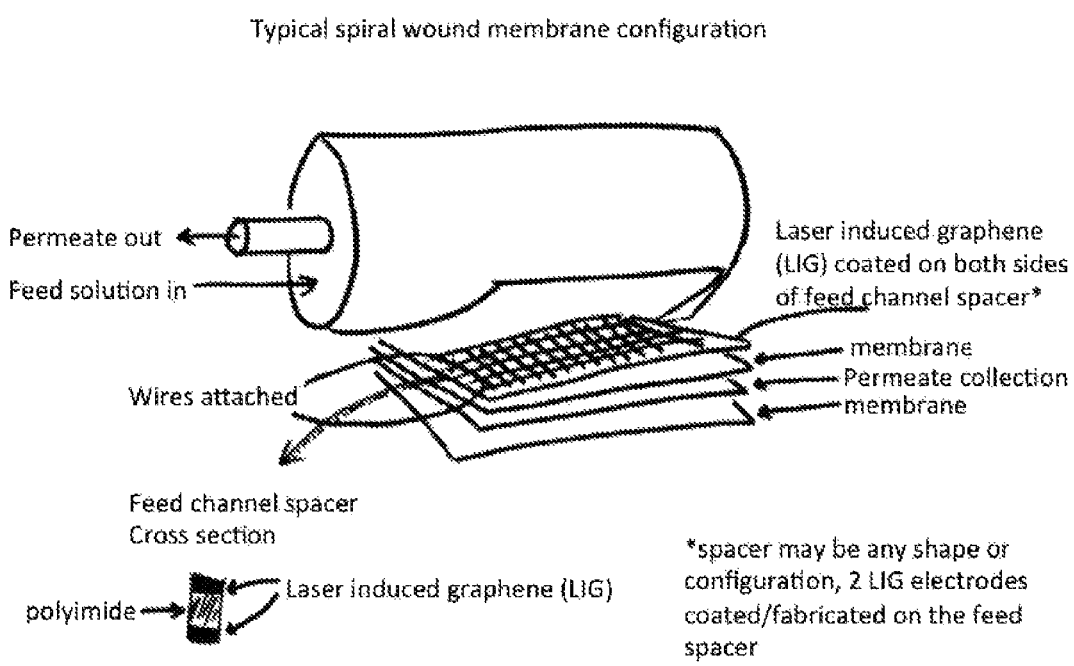
FIG. 34 shows schematically a spiral-wound membrane configuration with an LIG-coated spacer and electrodes.

An RO membrane (ESPA type DHR, from Hydranautics) was measured in a cross-flow configuration, schematically demonstrated in the FIG. 34, at a constant pressure of 10 bar. The feed water consisted of synthetic wastewater with 0.1% Luria-Bertani (LB) containing an initial bacterial concentration of ~$10^6$ CFU/mL of *P. aeruginosa*. The synthetic wastewater had the following salts composition: 1.16 mM sodium citrate, 0.94 mM ammonium chloride, 0.45 mM potassium dihydrogen phosphate ($KH_2PO_4$), 0.5 mM calcium chloride dehydrate ($CaCl_2.2H_2O$), 0.5 mM sodium bicarbonate ($NaHCO_3$), 2.0 mM sodium chloride (NaCl), and 0.6 mM magnesium sulfate septahydrate ($MgSO_4.7H_2O$), all dissolved in deionized (DI) water. The final pH of the feed was 7.4 with ionic strength of 14.6 mM.

A laboratory-scale cross-flow system was used, as described in Herzberg et al (Herzberg, M.; Elimelech, M. Biofouling of Reverse Osmosis Membranes: Role of Biofilm-Enhanced Osmotic Pressure. J. Memb. Sci. 2007, 295, 11-20). The cell was used to measure RO membranes in a cross-flow configuration, where both retentate and permeate could be recycled back to the feed solution tank. The feed spacer consisted of a perforated PI sheet as described above in example 4. LIG was printed on both sides of the PI sheet between the square holes at duty cycle of 2%, image density of 1,000 pulses per inch in both axes and rastering speed of 30 cm per second, with air blown through the nozzle and the system maintained at still air at ambient pressure. Graphite threads were glued to each side of the LIG spacer with carbon glue. The graphite threads were coming out of the cell and attached to a switch and a potential of 2.5 V. The spacer was cut to a size of 9.0×2.0 cm and placed on the feed channel side, between two standard commercial spacer nets (polypropylene, taken from an RO module).

Permeate and retentate were recirculated to the feed reservoir (10 L). The experiments were done at 10 bar (145.0 psi) with 105 L/h flow rate, and pre-compaction of the membrane was done at 15 bar (217.5 psi) for 24 h using DI water. The temperature in the cross flow assembly was controlled at 25° C. via a chiller equipped with a temperature control system. The change in flux was measured over time and the bacterial population was characterized using the spread plate method. Confocal microscopy was performed on the membrane surface after the experiment was complete and showed differences to the control membrane.

Figure 35:
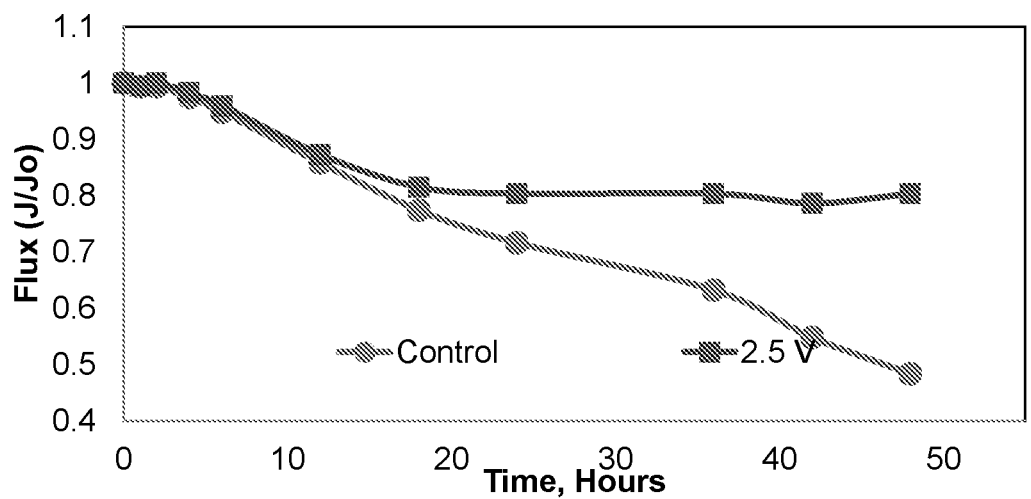
FIG. 35 shows a graph describing flux change over time using an ESPA membrane in a cross flow configuration and 2% LIG coated feed spacer configured as an electrode, with 2.5V applied, from the Example 7.
Figure 36:
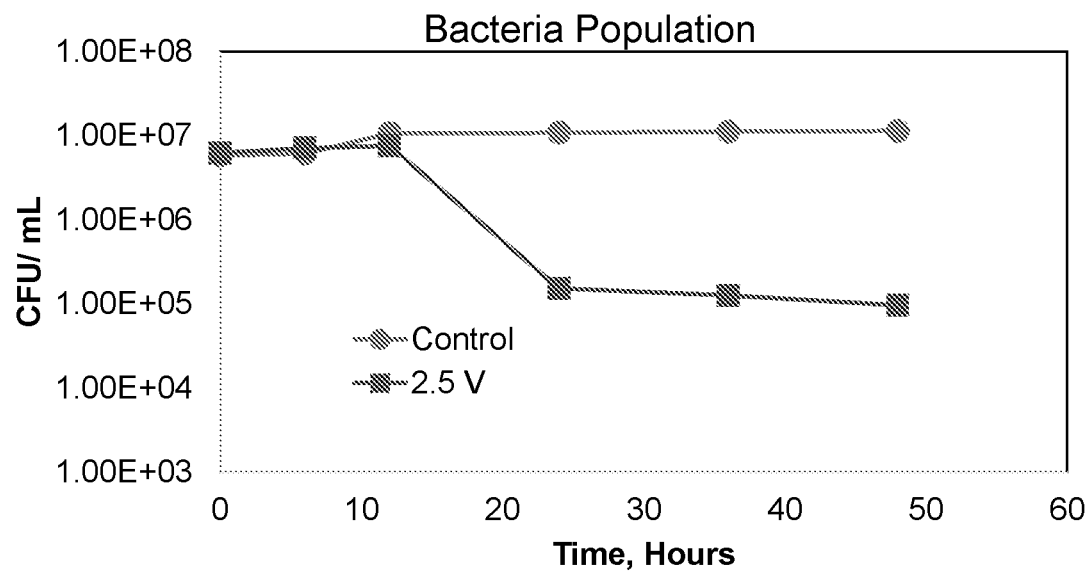
FIG. 36 shows bacterial population in the recycled feed solution over the duration of the experiment as described in the Example 7.

Both the reduction of flux was monitored as well as the amount of viable bacteria in the recycled feed solution, represented in FIGS. 35 and 36 respectively. In the Figures, the filled circle represents the flux and the viable counts, respectively, of the control, and filled square of the 2.5 V potential. As can be seen, the flux declined over the first ca. 10 hours in both the control experiment, which contained the LIG spacer at either 0 V (open circuit potential) and at 2.5 V (FIG. 35). Without being bound by a theory it is believed that this might be due to organic fouling from nutrients in the feed solution, or simply further equilibration of the membrane with the feed solution. However, after 10 hours, the LIG spacer at 2.5 V prevented further flux decrease. When open circuit potential was applied (0 V), the flux continued to decrease until the end point of the experiment. This could be attributed to biofilm growth on the membrane surface, which increases the membrane resistance. Also noteworthy is that the LIG spacer at 2.5 V reduced the bacterial load in the recycled feed solution by 2 log units (FIG. 36). After 48 h, the amount of bacteria with the feed spacer at 0 V was ca. $10^7$ CFU/mL compared to $10^5$ CFU/mL when 2.5 V was applied. The lack of flux reduction in the system after 10 hours indicated that the LIG spacer at 2.5 V drastically inhibited biofilm growth on the membrane.

The invention claimed is:

1. A method for combating biofouling or controlling microorganisms on a component in an aqueous medium, wherein the method comprises
    (a) selecting a component having a surface, wherein
        (i) the surface comprises a polymer material, and
        (ii) the polymer material is not graphene and is not graphene oxide;
    (b) generating a surface-coating on the surface, wherein
        (i) the surface-coating comprises at least one laser-induced graphene (LIG) layer, and
        (ii) the surface-coating is generated by irradiating the polymer material of the surface with a laser beam to form the at least one LIG layer on the surface; and
    (c) providing the component in said aqueous medium, wherein
        (i) the surface-coating combats biofouling or controls the growth of microorganisms on the component in the aqueous medium.

2. The method of claim 1 comprising coating the component with the polymer material to form the component having the surface comprising the polymer material, wherein the component is prone to biofilm formation.

3. The method of claim 1, wherein said polymer material comprises a polymer selected from a group consisting of chain growth polymers and step growth polymers.

4. The method of claim 1, wherein said polymer material comprises a polymer selected from a group consisting of vinyl polymers and condensation polymers.

5. The method of claim 2, wherein said component prone to biofilm formation is a a pipe, a watercraft, a fuel storage tank, or of an element in a water-treatment device.

6. The method of claim 5, wherein said element in a water-treatment device is a membrane spacer.

7. The method of claim 1 further comprising applying electrical potential to said at least one LIG layer.

8. The method of claim 7, wherein said electrical potential is in the range between 0.5 V and 5 V.

9. The method of claim 8, wherein said electrical potential is in the range between 1.1 V and 3.5 V.

10. The method of claim 7, wherein said electrical potential is applied continuously for periods of at least 1 second.

11. The method of claim 1, wherein the component is at least one spacer, and wherein the method comprises treating water-by passing a water stream through a membrane module equipped with the at least one spacer coated with the at least one layer of LIG.

12. A method according to claim 11 further comprising applying an electric potential to the at least one LIG layer, to achieve a bactericidal effect in the water stream.

13. The method of claim 1, wherein the component is a membrane spacer.

14. The method of claim 13 further comprising applying electrical potential to said at least one LIG layer.

15. The method of claim 13, wherein the membrane spacer comprises a polymeric mesh.

16. The method of claim 15, wherein the polymeric mesh comprises polyimide.

17. The method of claim 15, wherein the polymeric mesh is coated with at least two spaced apart LIG layers.

18. The method of claim 1, wherein said polymer material comprises polyimide.

* * * * *